US012608365B2

(12) United States Patent
Rando

(10) Patent No.: US 12,608,365 B2
(45) Date of Patent: Apr. 21, 2026

(54) SYSTEM AND METHOD FOR SETTING AND MONITORING CHECKPOINTS IN STRUCTURED DATA

(71) Applicant: WorkStarr, Inc., Attleboro, MA (US)

(72) Inventor: Joseph D. Rando, Sharon, MA (US)

(73) Assignee: WorkStarr, Inc., Attleboro, MA (US)

( * ) Notice: Subject to any disclaimer, the term of this patent is extended or adjusted under 35 U.S.C. 154(b) by 0 days.

(21) Appl. No.: 18/812,698

(22) Filed: Aug. 22, 2024

(65) Prior Publication Data

US 2026/0056939 A1 Feb. 26, 2026

(51) Int. Cl.
*G06F 7/00* (2006.01)
*G06F 16/23* (2019.01)
*G06F 17/00* (2019.01)

(52) U.S. Cl.
CPC ...... *G06F 16/2379* (2019.01); *G06F 16/2358* (2019.01)

(58) Field of Classification Search
None
See application file for complete search history.

(56) References Cited

U.S. PATENT DOCUMENTS 11,625,751 B2 4/2023 Longo et al.
11,755,963 B1 * 9/2023 Avital .................. G06Q 10/025
705/6

2012/0310693 A1 * 12/2012 Rataul .............. G05B 19/41805
705/7.14
2018/0060795 A1 * 3/2018 Stefik ............. G06Q 10/063116
2020/0264940 A1 * 8/2020 Guereca-Pinuelas ... G06F 9/542
2021/0081559 A1 * 3/2021 Gratton .................. H04W 4/02
2021/0374801 A1 * 12/2021 Longo ................ G06Q 30/0255
2022/0066992 A1 * 3/2022 Duval ................. G06F 12/0246

FOREIGN PATENT DOCUMENTS

IN 202221006228 A 2/2022
IN 202311087650 A 2/2024
WO 2000028454 A1 5/2000

* cited by examiner

*Primary Examiner* — Tuan A Pham
(74) *Attorney, Agent, or Firm* — Caldwell LLC

(57) ABSTRACT

Systems for setting and monitoring checkpoints in structured data and methods used therein include a processor and a memory connected to the processor, wherein the memory contains instructions configuring the processor to retrieve event data, wherein the event data includes an objective, generate, using a first machine learning model, a checkpoint as a function of the event data, validate the checkpoint against the event data and the objective, monitor, using a second machine learning model, a progress as a function of the validated checkpoint, wherein monitoring the progress includes receiving supplemental event data, comparing the supplemental event data against the checkpoint, and generating a progress indication as a function of the comparison, and generate a recommended course of action as a function of the progress indication.

18 Claims, 9 Drawing Sheets

200

172

180

176

152

164

500

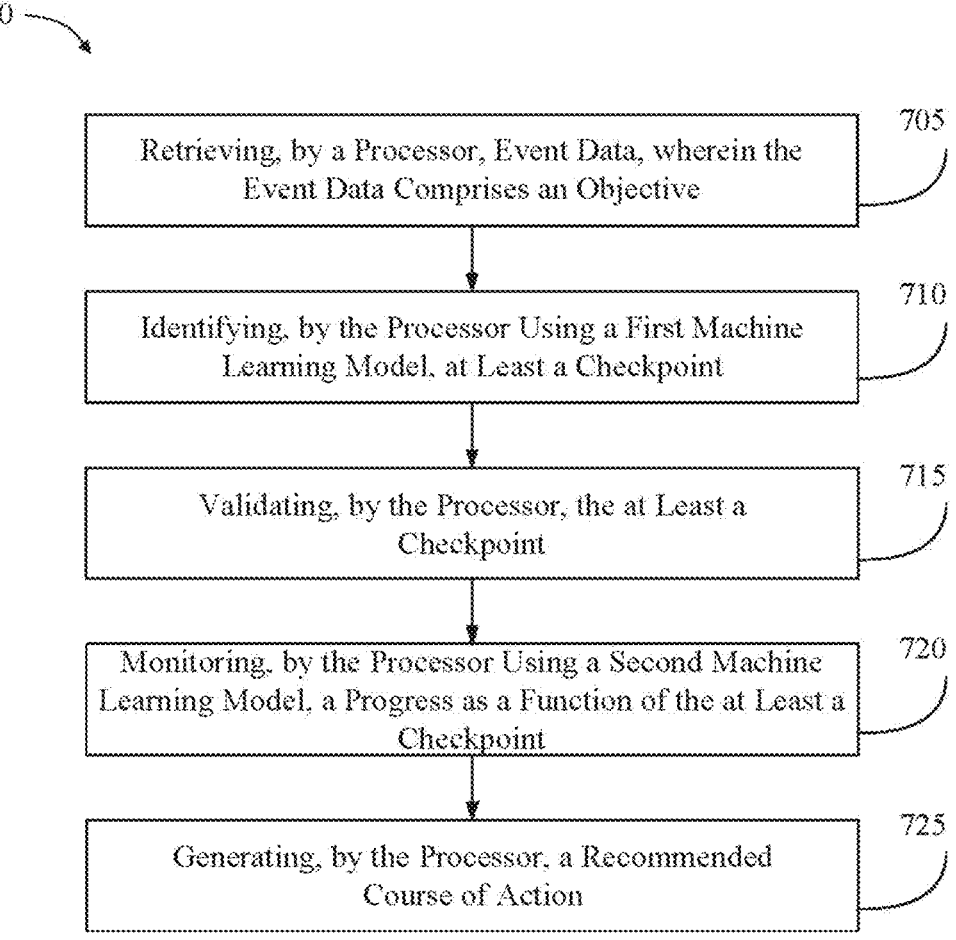

700

Retrieving, by a Processor, Event Data, wherein the Event Data Comprises an Objective — 705

Identifying, by the Processor Using a First Machine Learning Model, at Least a Checkpoint — 710

Validating, by the Processor, the at Least a Checkpoint — 715

Monitoring, by the Processor Using a Second Machine Learning Model, a Progress as a Function of the at Least a Checkpoint — 720

Generating, by the Processor, a Recommended Course of Action — 725

FIG. 7

SYSTEM AND METHOD FOR SETTING AND MONITORING CHECKPOINTS IN STRUCTURED DATA

FIELD OF THE INVENTION

The present invention generally relates to the field of data management and machine learning. In particular, the present invention is directed to apparatus and methods for setting and monitoring checkpoints in structured data.

BACKGROUND

Data management, such as consolidation and distribution of data and tasks, typically involves intricate coordination among several parties and many interdependent elements. As a result, data management is often plagued by delays and distractions, therefore requiring frequent monitoring and human intervention. These drawbacks often cause waste of time, labor, and resources.

SUMMARY OF THE DISCLOSURE

In an aspect, a system for setting and monitoring checkpoints in structured data is described. System includes a processor and a memory communicatively connected to the processor, wherein the memory contains instructions configuring the processor to retrieve event data, wherein the event data includes at least an objective. Processor is further configured to identify, using a first machine learning model trained on checkpoint identification training data, at least a checkpoint as a function of retrieved event data. Processor is further configured to validate at least a checkpoint against event data and at least an objective. Processor is further configured to monitor, using a second machine learning model trained on progress indication training data, a progress as a function of at least a checkpoint, wherein monitoring the progress includes receiving supplemental event data, comparing the supplemental event data against the at least a checkpoint, and generating a progress indication as a function of the comparison. Processor is further configured to generate a recommended course of action as a function of progress indication.

In another aspect, a method for setting and monitoring checkpoints in structured data is described. Method includes retrieving, by processor, event data, wherein the event data includes at least an objective. Method further includes identifying, by processor using first machine learning model trained on checkpoint identification training data, at least a checkpoint as a function of retrieved event data. Method further includes validating, by processor, generated at least a checkpoint against event data and at least an objective. Method further includes monitoring, by processor using second machine learning model trained on progress indication training data, progress as a function of validated at least a checkpoint, wherein monitoring the progress includes receiving supplemental event data, comparing the supplemental event data against the at least a checkpoint, and generating a progress indication as a function of the comparison. Method further includes generating, by processor, recommended course of action as a function of progress indication.

These and other aspects and features of nonlimiting embodiments of the present invention will become apparent to those skilled in the art upon review of the following description of specific nonlimiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 7 is an exemplary flow diagram illustrating a method for setting and monitoring checkpoints in structured data;

Figure 1:
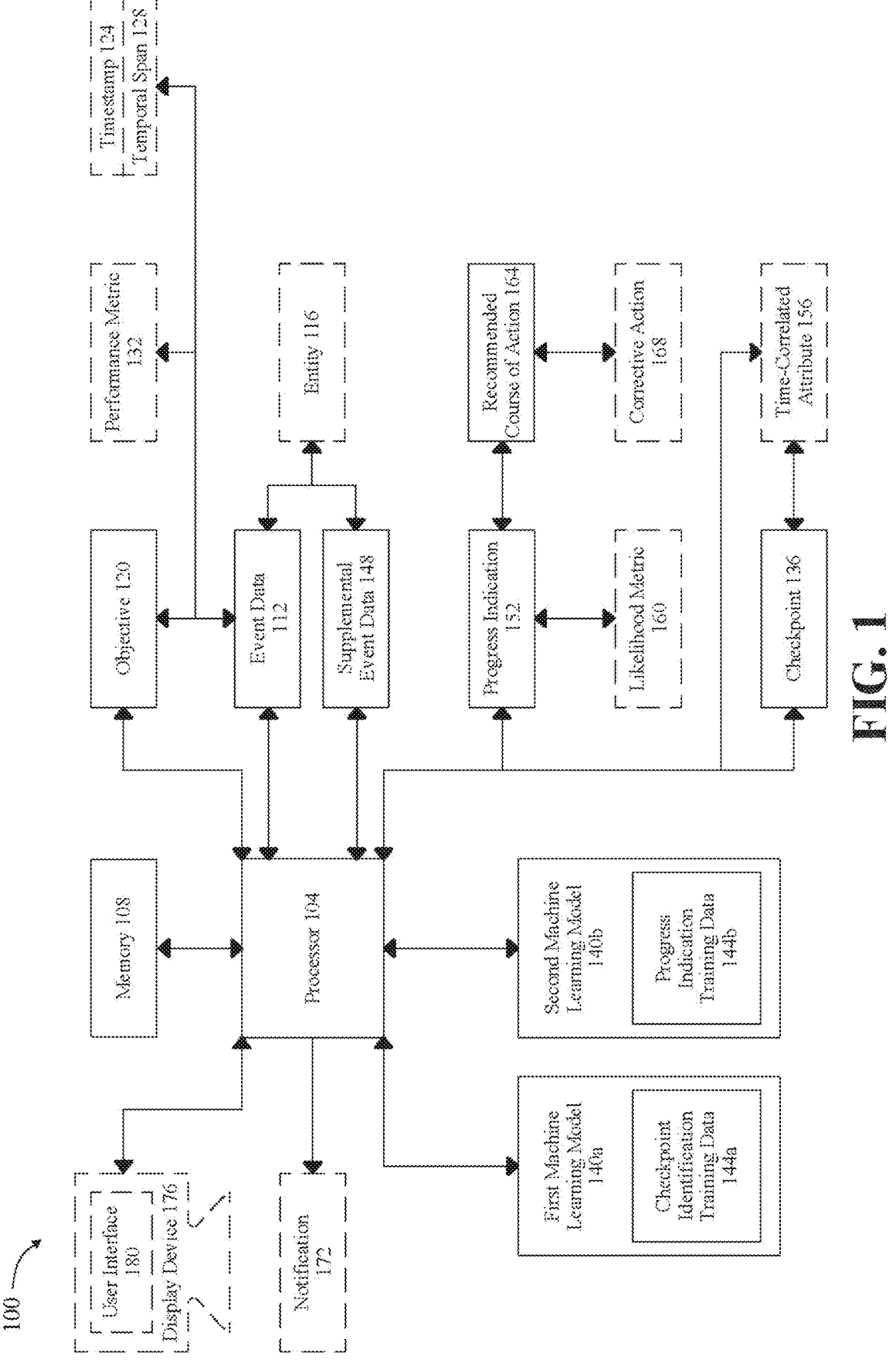
FIG. 1 is an exemplary embodiment of a system for setting and monitoring checkpoints in structured data.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for setting and monitoring checkpoints in structured data. System includes a processor and a memory communicatively connected to the processor, wherein the memory contains instructions configuring the processor to retrieve event data. Event data includes at least an objective. In one or more embodiments, retrieving event data may include identifying a plurality of timestamps from event data, determining a temporal span as a function of the plurality of timestamps, and determining at least an objective as a function of the plurality of timestamps and the temporal span. Processor is further configured to identify, using a first machine learning model trained on checkpoint identification training data, at least a checkpoint as a function of event data. Processor is further configured to validate at least a checkpoint against event data and at least an objective. In one or more embodiments, event data may further include a performance metric pertaining to entity; accordingly, validating at least a checkpoint may include modifying the at least a checkpoint as a function of the performance metric. Processor is further configured to monitor, using a second machine learning model trained on progress indication training data, a progress as a function of at least a checkpoint, wherein monitoring the progress includes receiving supplemental event data, comparing the supplemental event data against the at least a checkpoint, and generating a progress indication as a function of the comparison. In one or more embodiments, comparing supplemental event data against validated at least a checkpoint may include extracting from the validated at least a checkpoint a first time-correlated attribute, extracting from the supplemental event data a second time-correlated attribute, and comparing the second time-correlated attribute against the first time-correlated attribute. In one or more embodiments, progress indication may include a likelihood metric. Processor is further configured to generate a recommended course of action as a function of progress indication. In one or more embodiments, recommended course of action may include at least a corrective action. In one or more embodiments, generating recommended course of action may include modifying at least an objective as a function of progress indication. In one or more embodiments, processor may be further configured to generate a notification as a function of at least a recommended course of action and display the notification to entity using a user interface.

Aspects of the present disclosure may be used to provide automated corrective measures in data management. Aspects of this disclosure may be used to streamline project management efforts. Aspects of this disclosure may be used to provide superior allocation of resources. Exemplary embodiments illustrating aspects of the present disclosure are described below in the context of several specific examples.

Referring now to FIG. 1, an exemplary embodiment of a system 100 for setting and monitoring checkpoints in structured data is illustrated. System 100 includes a processor 104. In one or more embodiments, processor 104 may include a computing device. Computing device could include any analog or digital control circuit, including an operational amplifier circuit, a combinational logic circuit, a sequential logic circuit, an application-specific integrated circuit (ASIC), a field programmable gate arrays (FPGA), or the like. Computing device may include a processor communicatively connected to a memory, as described above. Computing device may include any computing device as described in this disclosure, including without limitation a microcontroller, microprocessor, digital signal processor, and/or system on a chip as described in this disclosure. Computing device may include, be included in, and/or communicate with a mobile device such as a mobile telephone, smartphone, or tablet. Computing device may include a single computing device operating independently, or may include two or more computing device operating in concert, in parallel, sequentially, or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a first computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. A person of ordinary skill in the art, upon reviewing the entirety of this disclosure, will be aware of various ways in which steps, sequences of steps, processing tasks, and/or data may be subdivided, shared, or otherwise dealt with using iteration, recursion, and/or parallel processing. More details regarding computing devices will be described below.

With continued reference to FIG. 1, system 100 includes a memory 108 communicatively connected to processor 104, wherein the memory 108 contains instructions configuring the processor 104 to perform any processing steps described herein. For the purposes of this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device. Communicative connecting may also include indirect connections via, for example and without limitation, wireless connection, radio communication, low-power wide-area network, optical communication, magnetic, capacitive, or optical coupling, and the like. In some instances, the terminology "communicatively coupled" may be used in place of communicatively connected in this disclosure.

With continued reference to FIG. 1, computing device may perform determinations, classification, and/or analysis steps, methods, processes, or the like as described in this disclosure using machine learning processes. For the purposes of this disclosure, a "machine learning process" is a process that automatedly uses a body of data known as "training data" and/or a "training set" to generate an algorithm that will be performed by a processor module to produce outputs given data provided as inputs. This is in contrast to a nonmachine learning software program where the commands to be executed are determined in advance by a user and written in a programming language. A machine learning process may utilize supervised, unsupervised, lazy-learning processes and/or neural networks. More details regarding computing devices and machine learning processes will be provided below.

With continued reference to FIG. 1, in one or more embodiments, one or more machine learning models may be used to perform certain function or functions of system 100, such as generating checkpoints, as described below. Processor 104 may use a machine learning module to implement one or more algorithms as described herein or generate one or more machine learning models as described below. However, machine learning module is exemplary and may not be necessary to generate one or more machine learning models and perform any machine learning described herein. In one or more embodiments, one or more machine learning models may be generated using training data. Training data may include inputs and corresponding predetermined outputs so that machine learning model may use correlations between the provided exemplary inputs and outputs to develop an algorithm and/or relationship that then allows the machine learning model to determine its own outputs for inputs. Training data may contain correlations that a machine learning process may use to model relationships between two or more categories of data elements. Exemplary inputs and outputs may be retrieved from a database, selected from one or more historic records or user profiles, or be provided by a user. In one or more embodiments, machine learning module may obtain training data by querying a communicatively connected database that includes past inputs and outputs. Training data may include inputs from various types of databases, resources, and/or user inputs and outputs correlated to each of those inputs, so that machine learning model may determine an output. Correlations may indicate causative and/or predictive links between data, which may be modeled as relationships, such as mathematical relationships, by machine learning models, as described in further detail below. In one or more embodiments, training data may be formatted and/or organized by categories of data elements by, for example, associating data elements with one or more descriptors corresponding to categories of data elements. As a nonlimiting example, training data may include data entered in standardized forms by persons or processes, such that entry of a given data element in a given field in a form may be mapped to one or more descriptors of categories. Elements in training data may be linked to descriptors of categories by tags, tokens, or other data elements. In one or more embodiments, training data may include previous outputs such that one or more machine learning models may iteratively produce outputs.

With continued reference to FIG. 1, system 100 may include or be communicatively connected to a database. For the purposes of this disclosure, a "database" is an organized collection of data or a type of data store based on the use of a database management system (DBMS), the software that interacts with end users, applications, and the database itself to capture and analyze the data. Database may be implemented, without limitation, as a relational database, a key-value retrieval database such as a NoSQL database, or any other format or structure for use as database that a person of ordinary skill in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described in this disclosure. Data entries in database may be flagged with or linked to one or more additional elements of information, which may be reflected in data entry cells and/or in linked tables such as tables related by one or more indices in database or another relational database. A person of ordinary skill in the art, upon reviewing the entirety of this disclosure, will be aware of various ways in which data entries in database may store, retrieve, organize, and/or reflect data and/or records as used herein, as well as categories and/or populations of data consistently with this disclosure.

With continued reference to FIG. 1, processor 104 is configured to retrieve event data 112. For the purposes of this disclosure, a "event data" is a data or a set of data pertaining to one or more aspects of an event or action that may be used as input to initiate subsequent steps or processes. Event data 112 may include any type of input or combination of inputs consistent with details described in this disclosure. As nonlimiting examples, event data 112 may include textual data such as email threads, audio data such as voicemails, or graphical data such as an attached image/digital file of an email or text message. Event data 112 may be retrieved from any suitable source or suitable combination of sources. As a nonlimiting example, a first event data 112 of plurality of event data 112 may be extracted from an email, whereas a second event data 112 of the plurality of event data 112 may be extracted from a voicemail. As another nonlimiting example, a first event data 112 may be retrieved from a work-related email address, whereas a second event data 112 may be retrieved from a private email address. Such features may enable system 100 to provide assistance to essentially every aspect of an entity's life or operation. As another nonlimiting example, event data 112 may include historical task completion data (e.g., historical task completion rates/times) pertaining to an entity. As another nonlimiting example, event data 112 may include contextual data (e.g., user data including user efficiency metrics, individual user performance history, current workload, and/or the like) pertaining to an entity. As another nonlimiting example, event data 112 may include external factors (e.g., holiday schedules, weather conditions, market conditions, service interruptions, staffing/organizational changes, and/or the like). In some cases, retrieving event data 112 may include extracting the event data 112 from one or more digital files. Such extraction may be performed using techniques such as optical character recognition or feature extraction, as disclosed in U.S. patent application Ser. No. 18/811,034, filed on Aug. 21, 2024, entitled "SYSTEM AND METHOD FOR AUTOMATED CONSOLIDA- TION AND DISTRIBUTION OF STRUCTURED DATA", the entirety of which is incorporated herein by reference.

With continued reference to FIG. 1, in one or more embodiments, event data 112 may pertain to one or more entities 116. pertaining to an entity 116for the purposes of this disclosure, an "entity" is an individual (i.e., a natural person), a group of individuals, a corporate or organization, a department or division within a corporate or organization, or otherwise any subject or party capable of participating in one or more functions of system 100 described in this disclosure. Entity 116 may include a first entity, a second entity, a third entity, or the like, the designation of which may be arbitrary depending on which entity is interacting with system 100. As a nonlimiting example, entity 116 may include an individual planning his/her work schedule for the upcoming month, a student learning a second language, a corporate representative in charge of planning an event or procuring supplies, or an organization handling a large quantity of customer-related matters, among others. "Entity", "user", and "party" may, in some cases, be used interchangeably in this disclosure.

With continued reference to FIG. 1, event data 112 includes at least an objective 120. For the purposes of this disclosure, an "objective" is a desired metric pertaining to one or more aspects of an event or action to be performed. Objective 120 may refer to any target, goal, progress, advancement, or achievement related to any aspects of entity 116. Objective 120 may be professional, e.g., a goal for job performance in the next quarter, or personal, e.g., a progress in mastering a hobby. Objective 120 may be physical, e.g., a weight loss, or spiritual, e.g., better mental wellbeing. In some cases, objective 120 may include a numerical objective 120, e.g., an increase in sale by 30% by the end of third quarter of 2024, or an increase in vocabulary by 20% by the end of the year. In some cases, objective 120 may include a time-related objective 120, e.g., completion of a task in the next two weeks in order to meet a hard deadline.

With continued reference to FIG. 1, in one or more embodiments, system 100 may include a content retrieval module configured to extract, organize, and/or categorize information from event data 112, using a plurality of content retrieval parameters. In some cases, content retrieval module may include or be configured to implement a machine learning model, algorithm, or process, such as a large language model and/or a feature extraction process, to interpret or summarize textual, audio, or graphical data. Details described herein regarding content retrieval module and elements related thereto may be consistent with any detail disclosed in U.S. patent application Ser. No. 18/811, 034, filed on Aug. 21, 2024, entitled "SYSTEM AND METHOD FOR AUTOMATED CONSOLIDATION AND DISTRIBUTION OF STRUCTURED DATA", the entirety of which is incorporated herein by reference.

With continued reference to FIG. 1, in one or more embodiments, event data 112 may include one or more time-related elements. In some cases, retrieving event data 112 may include identifying a first timestamp 124 and a second timestamp 124 from the event data 112. First and second timestamp 124 may each represent the start time and end time of an event or action, respectively. Subsequently, retrieving event data 112 may include determining a temporal span 128 as a function of first timestamp 124 and the second timestamp 124. Temporal span 128 may be measured in minutes, hours, days, months, quarters, years, or the like, according to a specific circumstance to which system 100 is applied. Accordingly, retrieving event data 112 may include determining at least an objective 120 as a function of first timestamp 124, second timestamp 124, and temporal span 128. As a nonlimiting example, if event data 112 specifies a project that begins on Jan. 1, 2024, and ends by Jun. 30, 2024, first timestamp 124, second timestamp 124, and temporal span 128 may be assigned as Jan. 1, 2024, Jun. 30, 2024, and 6 months (or 181 days), respectively. Accordingly, system 100 may set objective 120 as "100% complete by Jun. 30, 2024".

With continued reference to FIG. 1, in one or more embodiments, event data 112 may further include a performance metric 132 pertaining to entity 116. For the purposes of this disclosure, a "performance metric" is a measure pertaining directly or directly to one or more aspects of the professional competence of entity 116. Performance metric 132 may be calculated or determined based on any suitable source of information recognized by a person of ordinary skill in the art upon reviewing the entirety of this disclosure, such as without limitation historical task completion/success rates, efficiency measures, customer reviews, behavioral data or patterns, and/or the like. In some cases, performance metric 132 may be generated for entity 116 using a statistical distribution generated from a plurality of entities. As a nonlimiting example, performance metric 132 may include a numerical or percentile value such as 8/10, 80/100, or 80%. As a nonlimiting example, performance metric 132 may include a percentile ranking that indicates where entity 116 is positioned on a bell curve. As another nonlimiting example, performance metric 132 may include a categorical designation such as "superior", "above average", "average", "below average", and "poor". As another nonlimiting example, performance metric 132 may include a descriptive attribute or keyword such as "needs improvement", "efficient", "high-quality product", "best value", among others. In some cases, performance metric 132 may include or reflect one or more aspects of habits, work styles, work ethics, personal preferences, and/or the like pertaining to entity 116. As a nonlimiting example, entity 116 may prefer a hands-on management style at the early stage of a project but a laid-back management style instead as the project approaches completion. As another nonlimiting example, alternatively, entity 116 may prefer a laid-back management style at the early stage of a project but a hands-on management style instead as the project approaches completion.

With continued reference to FIG. 1, processor 104 is further configured to generate at least a checkpoint 136 as a function of retrieved event data 112. For the purposes of this disclosure, a "checkpoint" is a scheduled time within a timeline where the progress of a project is reviewed, and the project's status is evaluated against its objectives, deliverables, and milestones. Checkpoint 136 may provide a formal opportunity for progress evaluation, issue identification, decision making, stakeholder communication, and documentation, ensuring that a project remains aligned with its goals and can adapt to any necessary changes. In some cases, system 100 may implement one single checkpoint 136, such as without limitation at the midpoint of a proposed timeline for midterm evaluation. As a nonlimiting example, if event data 112 indicates that a project is expected to continue for a year, then system 100 may implement checkpoint 136 at the end of the sixth month to evaluate where the project is standing. In some cases, system 100 may implement a plurality of checkpoints 136. Plurality of checkpoints 136 may be scheduled at a set of evenly spaced timepoints in a timeline. As a nonlimiting example, plurality of checkpoints 136 may be scheduled at the end of the $3^{rd}$, $6^{th}$, $9^{th}$, and $12^{th}$ month within a one-year timeline. As another nonlimiting example, plurality of checkpoints 136 may be scheduled at the end of each month within a one-year timeline. Alternatively, plurality of checkpoints 136 may be clustered toward the beginning of a project, where timely intervention may be crucial; as entity becomes more familiar with the project, checkpoints 136 may follow a less frequent schedule, with wider temporal gaps in between. As a nonlimiting example, checkpoints may be scheduled at end of the $1^{st}$, $2^{nd}$, $3^{rd}$, $6^{th}$, and $12^{th}$ month within a one-year timeline. Alternatively, plurality of checkpoints 136 may be clustered toward both the beginning and the end of a project, which may ensure that the project not only receives sufficient attention at its early stage and but also wraps up in time before its expected deadline. As a nonlimiting example, checkpoints may be scheduled at end of the $1^{st}$, $2^{nd}$, $6^{th}$, $11^{th}$, and $12^{th}$ month within a one-year timeline. Various ways or styles of implementing checkpoints 136 may be prebuilt within system 100 for entity 116 to choose from. A person of ordinary skill in the art, upon reviewing the entirety of this disclosure, will be able to recognize proper ways to implement checkpoints 136 based on the specifics of a context in which system 100 is being used.

With continued reference to FIG. 1, processor 104 is configured to identify at least a checkpoint 136 using a first machine learning model 140a. Specifically, generating at least a checkpoint 136 may include receiving checkpoint identification training data 144a including a plurality of exemplary checkpoints correlated to a plurality of exemplary event data. Subsequently, generating at least a checkpoint 136 may include training first machine learning model 140a as a function of checkpoint identification training data 144a. Accordingly, system 100 may generate at least a checkpoint 136 using first machine learning model 140a. Implementation of first machine learning model 140a may be consistent with any type of machine learning model or algorithm described in this disclosure. In one or more embodiments, checkpoint identification training data 144a may include data specifically synthesized for training purposes using one or more generative models. In one or more embodiments, one or more event data 112 from previous sessions may be incorporated into checkpoint identification training data 144a upon validation. In one or more embodiments, checkpoint identification training data 144a may be retrieved from one or more databases and/or other repositories of similar nature or be supplied as one or more inputs from one or more entities. In one or more embodiments, at least a portion of checkpoint identification training data 144a may be added, deleted, replaced, or otherwise updated as a function of one or more inputs from one or more entities 116. A person of ordinary skill in the art, upon reviewing the entirety of this disclosure, will be able to recognize suitable means to implement first machine learning model 140a in system 100.

With continued reference to FIG. 1, processor 104 is further configured to validate at least a checkpoint 136 against event data 112 and at least an objective 120. For the purposes of this disclosure, "validation" is a process of confirming whether a hypothesis or proposal is correct or reasonable based on an independent information source. In one or more embodiments, results of validation may be binary, i.e., "correct" vs. "incorrect", or "reasonable" vs. "unreasonable". In one or more embodiments, results of validation may be expressed on one or more continuous scales. As a nonlimiting example, results of validation may include one or more confidence scores, e.g., a 95/100 or a 5/5. Accordingly, system 100 may approve checkpoint 136 for downstream processing or refute checkpoint 136 by initiating a revision, according to one or more preset or dynamically adjusted threshold or criteria. In one or more embodiments, validating at least a checkpoint 136 may include modifying the at least a checkpoint 136 as a function of performance metric 132, consistent with details described above. Such configuration may help ensure that checkpoints 136 are strategically placed according to the capability of entity 116. In other words, checkpoints 136, upon validation, may ideally be perceived by entity 116 as challenging in a constructive manner and attainable once a reasonable effort is made. Checkpoints 136 deemed too demanding may be relaxed. As a nonlimiting example, checkpoints 136 implemented monthly may be adjusted to a quarterly basis to adapt to the needs of entity 116. In contrary, checkpoints 136 deemed too lenient may be tightened. Similarly, validation of checkpoints 136 may help ensure that the checkpoints 136 align with the overall goal of a project and/or consistent with the responsibility assigned to entity 116.

With continued reference to FIG. 1, processor 104 is further configured to monitor a progress as a function of validated at least a checkpoint 136. Monitoring progress includes receiving supplemental event data 148 pertaining to entity, comparing the supplemental event data 148 against validated at least a checkpoint 136, and generating a progress indication 152 as a function of the comparison. For the purposes of this disclosure, a "supplemental event data" is a data that adds to event data 112 by providing additional details not necessarily captured in the event data 112. Supplemental event data 148 may include any type of input data consistent with details described above regarding event data 112. In one or more embodiments, supplemental event data 148 may be collected at a plurality of scheduled timepoints within a timeline, capturing the progress of an event or action in real-time or nearly real-time manner. Supplemental event data 148 may be either provided manually by entity as an explicit input or collected automatically in the background by system 100. In some cases, supplemental event data 148 may be submitted by entity 116 upon receiving a prompt or notification from system 100.

With continued reference to FIG. 1, in some cases, comparing supplemental event data 148 against at least a checkpoint 136 may include extracting from the validated at least a checkpoint 136 a first time-correlated attribute 156, extracting from the supplemental event data 148 a second time-correlated attribute 156, and comparing the second time-correlated attribute 156 against the first time-correlated attribute 156. For the purposes of this disclosure, a "time-correlated attribute" is a feature pertaining to an event or action at a particular timepoint. As a nonlimiting example, time-correlated attribute 156 may include a percentage of completion or the like, at one or more selected timepoints in a timeline, such as 1 day, 2 days, 1 week, or 2 weeks after an inception of an event or action and/or before an expected conclusion of the event or action. First time-correlated attribute 156 may include a time-correlated attribute 156 that is originally planned, e.g., "80% complete by day 8", whereas second time-correlated attribute 156 may include a time-correlated attribute 156 that is provided in supplemental event data 148, based on an actual progress pertaining to the event or action, e.g., "70% complete by day 8". Accordingly, processor 104 may be configured to compare second time-correlated attribute 156 with first time-correlated attribute 156 and determine progress indication 152 as "falling behind by 10%".

With continued reference to FIG. 1, for the purposes of this disclosure, a "progress indication" is a measure pertaining to the extent of completion of an action or event. Progress indication may include a numerical progress indication 152 such as without limitation "90% complete" or "9/10 complete". Alternatively, progress indication 152 may include a categorical progress indication 152 such as without limitation "ahead of schedule", "on time", or "behind schedule". Alternatively, progress indication 152 may include descriptive progress indication 152 such as without limitation "requires catchup", "requires additional help" or "requires extension of time".

With continued reference to FIG. 1, in one or more embodiments, progress indication 152 may include a likelihood metric 160. For the purposes of this disclosure, a "likelihood metric" is a probabilistic indication pertaining to one or more aspects of an event or action. In some cases, likelihood metric 160 may include a percentage metric, such as an "80% chance of completion". In some cases, likelihood metric 160 may pertain to whether a project may be completed/aborted. In some cases, likelihood metric 160 may pertain to whether a deadline may be met. In some cases, processor 104 may be configured to calculate a probability for each possible progress indication 152 within a set of possible progress indications 152 and select the possible progress indication 152 associated with the highest probability as its output. A person of ordinary skill in the art, upon reviewing the entirety of this disclosure, will be able to recognize suitable ways to implement likelihood metric 160 for system 100.

With continued reference to FIG. 1, processor 104 is configured to monitor progress, as described above, using a second machine learning model 140*b*. Specifically, monitoring process includes receiving progress indication training data 144*b* including a plurality of exemplary progress indications correlated to a plurality of exemplary supplemental event data and a plurality of exemplary checkpoints. Subsequently, monitoring process includes training second machine learning model 140*b* as a function of progress indication training data 144*b*. Accordingly, system 100 may be configured to generate progress indication 152 using second machine learning model 140*b*. Implementation of second machine learning model 140*b* may be consistent with any type of machine learning model or algorithm described in this disclosure. In one or more embodiments, progress indication training data 144*b* may include data specifically synthesized for training purposes using one or more generative models. In one or more embodiments, one or more event data 112, supplemental event data 148, among other relevant records from previous sessions, may be incorporated into progress indication training data 144*b* upon validation. In one or more embodiments, progress indication training data 144*b* may be retrieved from one or more databases and/or other repositories of similar nature or be supplied as one or more inputs from one or more entities. In one or more embodiments, at least a portion of progress indication training data 144*b* may be added, deleted, replaced, or otherwise updated as a function of one or more inputs from one or more entities 116. A person of ordinary skill in the art, upon reviewing the entirety of this disclosure, will be able to recognize suitable means to implement second machine learning model 140*b* in system 100.

With continued reference to FIG. 1, processor 104 is further configured to generate a recommended course of action 164 as a function of progress indication 152. For the purposes of this disclosure, a "recommended course of action" is a single action, or a series of actions, expected to be performed in response to progress indication 152. It may refer to any format pertaining to a delivery of information, a performance of activity, or the like, that is deemed relevant to system 100 by a person of ordinary skill in the art, upon reviewing the entirety of this disclosure. In some cases, generating recommended course of action 164 may include modifying at least an objective 120 as a function of progress indication 152. As nonlimiting examples, recommended course of action 164 may include a proposal to extend one or more deadlines, a suggestion to abort a project, reassign a project, or recruit additional entities in order to finish a project in time, a recommendation regarding a possible pivot in the direction of a project, or the like. In some cases, recommended course of action 164 may include at least a corrective action 168, such as a suggestion or an intervention for an entity to modify their work habits, efficiency, productivity, or problem-solving strategies in order to stay on track, among others. As a nonlimiting example, corrective action 168 may include one or more educational resources, such as without limitation tutorials or open courses.

With continued reference to FIG. 1, in one or more embodiments, processor 104 may be configured to generate a notification 172. Notification 172 may be generated in accordance with any detail disclosed in U.S. patent application Ser. No. 18/811,034, filed on Aug. 21, 2024, entitled "SYSTEM AND METHOD FOR AUTOMATED CONSOLIDATION AND DISTRIBUTION OF STRUCTURED DATA", the entirety of which is incorporated herein by reference. As a nonlimiting example, notification 172 may be generated to retrieve supplemental event data 148 from entity 116. As another nonlimiting example, notification 172 may be generated as a function of progress or progress indication 152, as described above. As a nonlimiting example, notification 172 may be generated as a function of recommended course of action 164, as described above.

With continued reference to FIG. 1, in one or more embodiments, system 100 may include a display device 176 communicatively connected to processor 104, wherein the display device 176 is configured to display notification 172. In one or more embodiments, system 100 may further include a user interface 180, wherein processor 104 is configured to display, using display device 176, notification 172, etc. For the purposes of this disclosure, a "display device" is a device configured to show visual information. In some cases, display device 176 may include a liquid crystal display (LCD), a cathode ray tube (CRT), a plasma display, a light emitting diode (LED) display, and any combinations thereof. Display device 176 may include, but is not limited to, a smartphone, tablet, laptop, monitor, tablet, and the like. Display device 176 may include a separate device that includes a transparent screen configured to display computer-generated images and/or information. In one or more embodiments, display device 176 may be configured to visually present data through a user interface or a graphical user interface (GUI) to at least a user, wherein the user may interact with the data through the user interface or GUI, as described below. In one or more embodiments, a user may view GUI through display device 176. In one or more embodiments, display device 176 may be located on remote device, as described below.

With continued reference to FIG. 1, display device 176 may include a remote device. For the purposes of this disclosure, a "remote device" is a computer device separate and distinct from system 100. For example, and without limitation, remote device may include a smartphone, a tablet, a laptop, a desktop computer, or the like. In one or more embodiments, remote device may be communicatively connected to system 100 such as, for example, through network communication, through Bluetooth communication, and/or the like. In one or more embodiments, processor 104 may retrieve event data 112, receive supplemental event data, and/or initiate one or more of subsequent steps through remote device. In one or more embodiments, one or more inputs from one or more users may be submitted through a user interface, such as a GUI, displayed using remote device, as described below.

With continued reference to FIG. 1, in one or more embodiments, system 100 may further include a user interface. For the purposes of this disclosure, a "user interface" is a means by which a user and a computer system interact, for example, using input devices and software. User interface may include a graphical user interface (GUI), command line interface (CLI), menu-driven user interface, touch user interface, voice user interface (VUI), form-based user interface, any combination thereof, or the like. In one or more embodiments, a user may interact with user interface using computing device distinct from and communicatively connected to processor 104, such as a smartphone, tablet, or the like operated by the user. User interface may include one or more graphical locator and/or cursor facilities allowing user to interact with graphical models and/or combinations thereof, for instance using a touchscreen, touchpad, mouse, keyboard, and/or other manual data entry device. For the purposes of this disclosure, a "graphical user interface (GUI)" is a type of user interface that allows end users to interact with electronic devices through visual representations. In one or more embodiments, GUI may include icons, menus, other visual indicators or representations (graphics), audio indicators such as primary notation, display information, and related user controls. Menu may contain a list of choices and may allow users to select one from them. A menu bar may be displayed horizontally across the screen as a pull-down menu. Menu may include a context menu that appears only when user performs a specific action. Files, programs, web pages, and the like may be represented using a small picture within GUI. In one or more embodiments, GUI may include a graphical visualization of a user profile and/or the like. In one or more embodiments, processor 104 may be configured to modify and/or update GUI as a function of at least an input or the like by populating a user interface data structure and visually presenting data through modification of the GUI.

With continued reference to FIG. 1, in one or more embodiments, GUI may contain one or more interactive elements. For the purposes of this disclosure, an "interactive element" is an element within GUI that allows for communication with processor 104 by one or more users. For example, and without limitation, interactive elements may include a plurality of tabs wherein selection of a particular tab, such as for example, by using a fingertip, may indicate to a system to perform a particular function and display the result through GUI. In one or more embodiments, interactive element may include tabs within GUI, wherein the selection of a particular tab may result in a particular function. In one or more embodiments, interactive elements may include words, phrases, illustrations, and the like to indicate a particular process that one or more users would like system to perform. A person of ordinary skill in the art, upon reviewing the entirety of this disclosure, will be aware of various ways in which user interfaces, GUIs, and/or elements thereof may be implemented and/or used as described in this disclosure.

With continued reference to FIG. 1, in one or more embodiments, display device 176 and/or remote device may be configured to display at least an event handler graphic corresponding to at least an event handler. For the purposes of this disclosure, an "event handler graphic" is a graphical element with which user interacts using display device 176 and/or remote device to enter data, for instance and without limitation, for event data 112, supplemental event data 148, or the like, as described above. Event handler graphic may include, without limitation, a button, a link, a checkbox, a text entry box and/or window, a drop-down list, a slider, or any other event handler graphic deemed suitable by a person of ordinary skill in the art upon reviewing the entirety of this disclosure. For the purposes of this disclosure, an "event handler" is a module, data structure, function, and/or routine that performs an action on display device 176 and/or remote device in response to one or more user inputs. For instance, and without limitation, event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to user in response to such requirements. Event handler may convert data into expected and/or desired formats, for instance such as date formats, currency entry formats, name formats, or the like. Event handler may transmit data from a remote device to computing device.

With continued reference to FIG. 1, in one or more embodiments, event handler may include a cross-session state variable. For the purposes of this disclosure, a "cross-session state variable" is a variable recording data entered on remote device during a previous session. Such data may include, for instance, previously entered text, previous selections of one or more elements as described above, or the like. For instance, cross-session state variable data may represent a search that user entered in a past session. Cross-session state variable may be saved using any suitable combination of client-side data storage on remote device and server-side data storage on computing device; for instance, data may be saved wholly or in part as a "cookie" which may include data or an identification of remote device to prompt provision of cross-session state variable by the computing device, which may store the data on the computing device. Alternatively, or additionally, computing device may use login credentials, device identifier, and/or device fingerprint data to retrieve cross-session state variable, which the computing device may transmit to remote device. Cross-session state variable may include at least a prior session datum. A prior session datum may include any element of data that may be stored in cross-session state variable. Event handler graphic may be further configured to display at least a prior session datum, for instance and without limitation, by auto-populating user query data from previous sessions.

With continued reference to FIG. 1, in one or more embodiments, processor 104 and/or computing device may configure display device 176 and/or remote device to generate a graphical view. For the purposes of this disclosure, a "graphical view" is a data structure that results in display of one or more graphical elements on a screen. Graphical view may include at least a display element. For the purposes of this disclosure, a "display element" is an image that a program and/or data structure cause to be displayed. Display elements may include, without limitation, windows, pop-up boxes, web browser pages, display layers, and/or any other display element deemed relevant by a person of ordinary skill in the art upon reviewing the entirety of this disclosure.

Graphical view may include at least a selectable event graphic corresponding to one or more selectable event handlers. For the purposes of this disclosure, a "selectable event graphic" is a graphical element that, upon selection, will trigger an action to be performed. Selection may be performed using a cursor or other locator as manipulated using a locator device such as a mouse, touchscreen, track pad, joystick, or the like. As a nonlimiting example, a selectable event graphic may include a redirection link, defined as a hyperlink, button, image, portion of an image, and/or other graphic containing or referring to a uniform resource locator (URL) and/or other resource locator to another graphical view including without limitation buttons, and/or to a process that performs navigation to such URL and/or other resource locator upon selection of selectable event graphic. Redirection may be performed using any event handler, including without limitation event handlers detecting the click of a mouse or other locator, access of redirection link using a touchscreen, the selection of any key, mouseover events, or the like.

Figure 2:
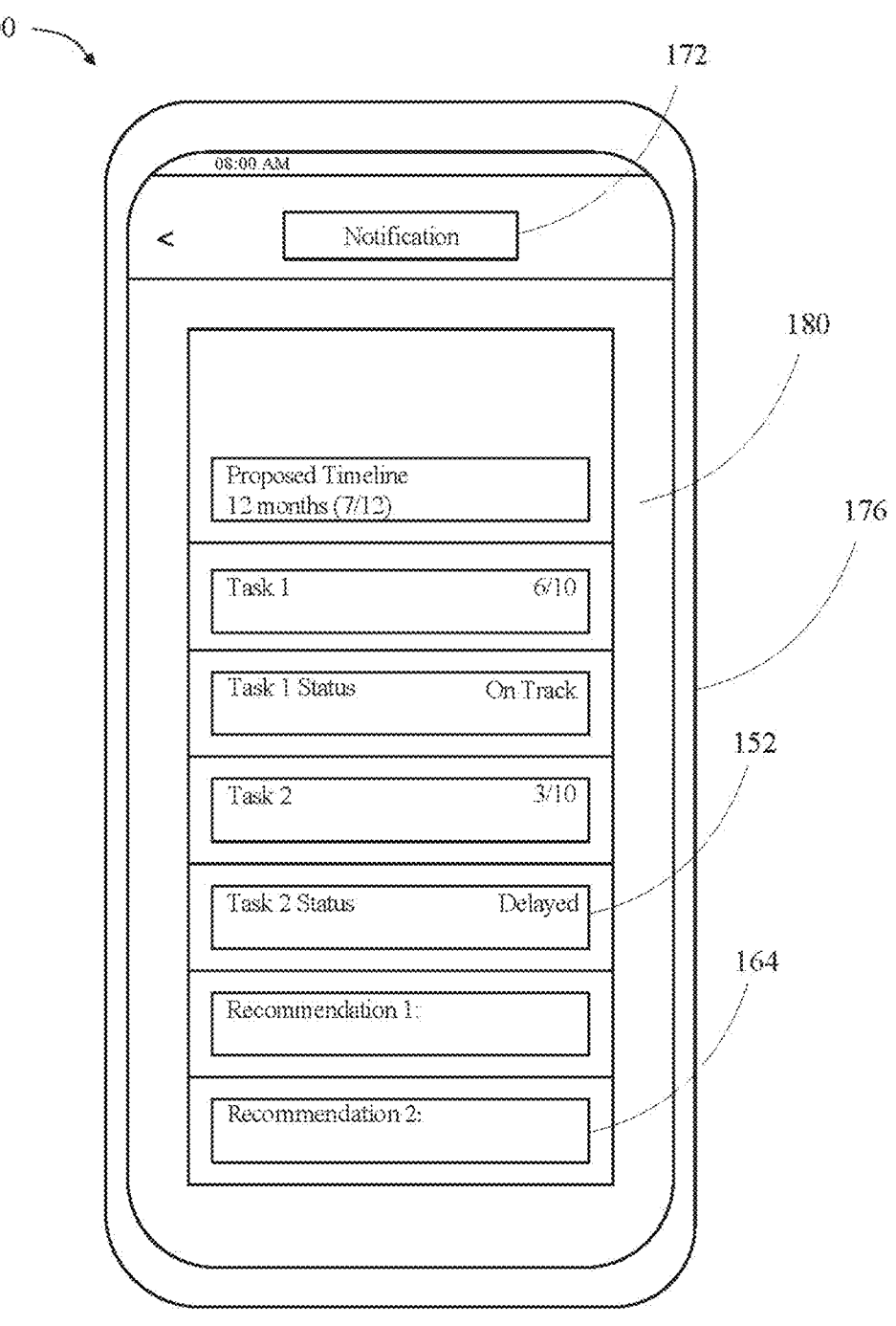
FIG. 2 is an exemplary embodiment of a user interface.

Referring now to FIG. 2, an exemplary embodiment 200 of user interface 180 is illustrated. User interface 180 may include notification 172. User interface 180 may include a proposed timeline, e.g., 12 months, and one or more checkpoints 136 within such timeline, e.g., $7^{th}$ month. User interface 180 may include a plurality of tasks, e.g., Task 1 and Task 2, and their associated progress indication 152, e.g., Task 1 Status and Task 2 Status. 6 out of 10 items have been completed for Task 1, whereas 3 out of 10 items have been completed for Task 2. Accordingly, Task 1 may be marked as "On Track", whereas Task 2 may be marked "Delayed". User interface 180 may also include recommended course of actions 164 and/or corrective action 168, consistent with details described above.

Figure 3:
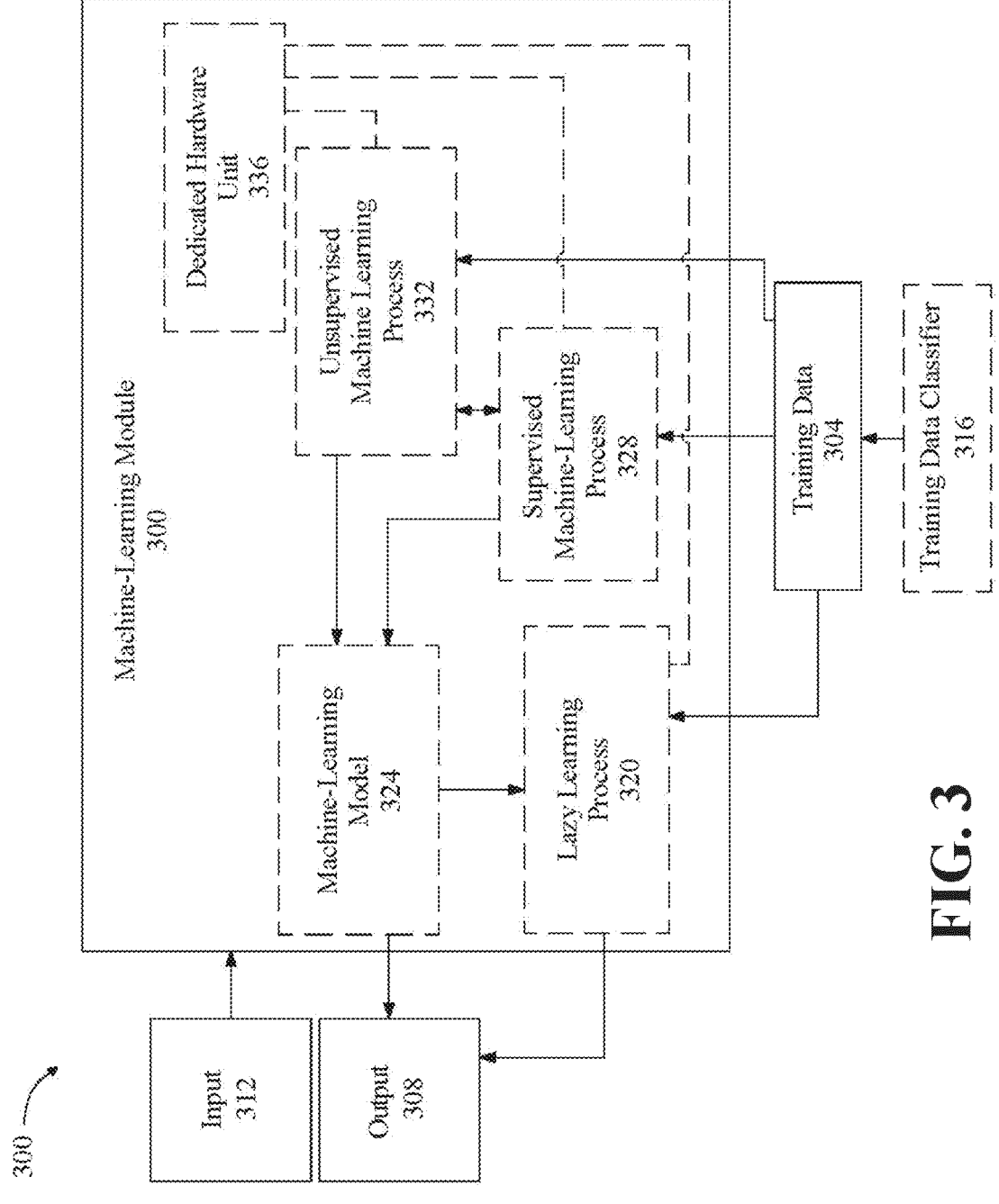
FIG. 3 is a block diagram of an exemplary embodiment of a machine learning process.

Referring now to FIG. 3, an exemplary embodiment of a machine learning module 300 that may perform one or more machine learning processes as described above is illustrated. Machine learning module may perform determinations, classification, and/or analysis steps, methods, processes, or the like as described in this disclosure using machine learning processes. For the purposes of this disclosure, a "machine learning process" is an automated process that uses training data 304 to generate an algorithm instantiated in hardware or software logic, data structures, and/or functions that will be performed by a computing device/module to produce outputs 308 given data provided as inputs 312. This is in contrast to a non-machine learning software program where the commands to be executed are pre-determined by user and written in a programming language.

With continued reference to FIG. 3, "training data", for the purposes of this disclosure, are data containing correlations that a machine learning process uses to model relationships between two or more categories of data elements. For instance, and without limitation, training data 304 may include a plurality of data entries, also known as "training examples", each entry representing a set of data elements that were recorded, received, and/or generated together. Data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories.

Multiple categories of data elements may be related in training data 304 according to various correlations; correlations may indicate causative and/or predictive links between categories of data elements, which may be modeled as relationships such as mathematical relationships by machine learning processes as described in further detail below. Training data 304 may be formatted and/or organized by categories of data elements, for instance by associating data elements with one or more descriptors corresponding to categories of data elements. As a nonlimiting example, training data 304 may include data entered in standardized forms by persons or processes, such that entry of a given data element within a given field in a given form may be mapped to one or more descriptors of categories. Elements in training data 304 may be linked to descriptors of categories by tags, tokens, or other data elements. For instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

With continued reference to FIG. 3, alternatively or additionally, training data 304 may include one or more elements that are uncategorized; that is, training data 304 may not be formatted or contain descriptors for some elements of data. Machine learning algorithms and/or other processes may sort training data 304 according to one or more categorizations using, for instance, natural language processing algorithms, tokenization, detection of correlated values in raw data, and the like; categories may be generated using correlation and/or other processing algorithms. As a nonlimiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine learning algorithms, and/or automated association of data in the data entry with descriptors or into a given format. The ability to categorize data entries automatedly may enable the same training data 304 to be made applicable for two or more distinct machine learning algorithms as described in further detail below. Training data 304 used by machine learning module 300 may correlate any input data as described in this disclosure to any output data as described in this disclosure. As a nonlimiting illustrative example, inputs may include plurality of event data 112, whereas outputs may include plurality of exemplary checkpoints 136.

With continued reference to FIG. 3, training data 304 may be filtered, sorted, and/or selected using one or more supervised and/or unsupervised machine learning processes and/or models as described in further detail below; such processes and/or models may include without limitation a training data classifier 316. For the purposes of this disclosure, a "classifier" is a machine learning model that sorts inputs into categories or bins of data, outputting the categories or bins of data and/or labels associated therewith. Machine learning model may include without limitation a data structure representing and/or using a mathematical model, neural net, or a program generated by a machine learning algorithm, known as a "classification algorithm". A classifier may be configured to output at least a datum that labels or otherwise identifies a set of data that are clustered together, found to be close under a distance metric as described below, or the like. A distance metric may include any norm, such as, without limitation, a Pythagorean norm. Machine learning module 300 may generate a classifier using a classification algorithm. For the purposes of this disclosure, a "classification algorithm" is a process wherein a computing device and/or any module and/or component operating therein derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, Fisher's linear discriminant, quadratic classifiers, decision trees, boosted trees, random forest classifiers, learning vector quantization, and/or neural network-based classifiers. In one or more embodiments, training data classifier 316 may classify elements of training data to a plurality of cohorts as a function of certain topics or traits.

With continued reference to FIG. 3, in one or more embodiment, identifying at least a checkpoint 136 may include training a first classifier 316 using checkpoint generation training data 144a, wherein the checkpoint generation training data 144a includes a plurality of exemplary checkpoints correlated to a plurality of exemplary primary input data. In one or more embodiments, monitoring progress may include training a second classifier 316 using progress indication training data 144b, wherein the progress indication training data 144b includes a plurality of exemplary progress indications correlated to a plurality of exemplary supplemental event data and a plurality of exemplary checkpoints.

With continued reference to FIG. 3, machine learning module 300 may be configured to generate a classifier using a naive Bayes classification algorithm. Naive Bayes classification algorithm generates classifiers by assigning class labels to problem instances, represented as vectors of element values. Class labels are drawn from a finite set. Naive Bayes classification algorithm may include generating a family of algorithms that assume that the value of a particular element is independent of the value of any other element, given a class variable. Naive Bayes classification algorithm may be based on Bayes Theorem expressed as $P(A/B)=P(B/A)\times P(A)\div P(B)$, where $P(A/B)$ is the probability of hypothesis A given data B, also known as posterior probability; $P(B/A)$ is the probability of data B given that the hypothesis A was true; $P(A)$ is the probability of hypothesis A being true regardless of data, also known as prior probability of A; and $P(B)$ is the probability of the data regardless of the hypothesis. A naive Bayes algorithm may be generated by first transforming training data into a frequency table. Machine learning module 300 may then calculate a likelihood table by calculating probabilities of different data entries and classification labels. Machine learning module 300 may utilize a naive Bayes equation to calculate a posterior probability for each class. A class containing the highest posterior probability is the outcome of prediction. Naive Bayes classification algorithm may include a gaussian model that follows a normal distribution. Naive Bayes classification algorithm may include a multinomial model that is used for discrete counts. Naive Bayes classification algorithm may include a Bernoulli model that may be utilized when vectors are binary.

With continued reference to FIG. 3, machine learning module 300 may be configured to generate a classifier using a k-nearest neighbors (KNN) algorithm. For the purposes of this disclosure, a "k-nearest neighbors algorithm" is or at least includes a classification method that utilizes feature similarity to analyze how closely out-of-sample features resemble training data 304 and to classify input data to one or more clusters and/or categories of features as represented in training data 304. This may be performed by representing both training data 304 and input data in vector forms and using one or more measures of vector similarity to identify classifications within training data 304 and determine a classification of input data. K-nearest neighbors algorithm may include specifying a k-value, or a number directing the classifier to select the k most similar entries of training data 304 to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a nonlimiting example, an initial heuristic may include a ranking of associations between inputs 312 and elements of training data 304. Heuristic may include selecting some number of highest-ranking associations and/or training data elements.

With continued reference to FIG. 3, generating k-nearest neighbors algorithm may generate a first vector output containing a data entry cluster, generating a second vector output containing input data, and calculate the distance between the first vector output and the second vector output using any suitable norm such as cosine similarity, Euclidean distance measurement, or the like. Each vector output may be represented, without limitation, as an n-tuple of values, where n is at least 2. Each value of n-tuple of values may represent a measurement or other quantitative value associated with a given category of data or attribute, examples of which are provided in further detail below. A vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent when their directions and/or relative quantities of values are the same; thus, as a nonlimiting example, a vector represented as [5, 10, 15] may be treated as equivalent, for the purposes of this disclosure, as a vector represented as [1, 2, 3]. Vectors may be more similar where their directions are more similar, and more different where their directions are more divergent. However, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized", or divided by a "length" attribute, such as a length attribute l as derived using a Pythagorean norm:

$$ l = \sqrt{\sum_{i=0}^{n} a_i^2}, $$

where $\alpha_i$ is attribute number of vector i. Scaling and/or normalization may function to make vector comparison independent of absolute quantities of attributes, while preserving any dependency on similarity of attributes. This may, for instance, be advantageous where cases represented in training data 304 are represented by different quantities of samples, which may result in proportionally equivalent vectors with divergent values.

With continued reference to FIG. 3, training examples for use as training data may be selected from a population of potential examples according to cohorts relevant to an analytical problem to be solved, a classification task, or the like. Alternatively, or additionally, training data 304 may be selected to span a set of likely circumstances or inputs for a machine learning model and/or process to encounter when deployed. For instance, and without limitation, for each category of input data to a machine learning model and/or process that may exist in a range of values in a population of phenomena such as images, user data, process data, physical data, or the like, a computing device, processor 104, and/or machine learning module 300 may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively, or additionally, a set of training examples may be compared to a collection of representative values in a database and/or presented to user, so that a process can detect, automatically or via user input, one or more values that are not included in the set of training examples. Computing device, processor 104, and/or machine learning module 300 may automatically generate a missing training example. This may be done by receiving and/or retrieving a missing input and/or output value and correlating the missing input and/or output value with a corresponding output and/or input value collocated in a data record with the retrieved value, provided by user, another device, or the like.

With continued reference to FIG. 3, computing device, processor 104, and/or machine learning module 300 may be configured to preprocess training data 304. For the purposes of this disclosure, "preprocessing" training data is a process that transforms training data from a raw form to a format that can be used for training a machine learning model. Preprocessing may include sanitizing, feature selection, feature scaling, data augmentation and the like.

With continued reference to FIG. 3, computing device, processor 104, and/or machine learning module 300 may be configured to sanitize training data. For the purposes of this disclosure, "sanitizing" training data is a process whereby training examples that interfere with convergence of a machine learning model and/or process are removed to yield a useful result. For instance, and without limitation, a training example may include an input and/or output value that is an outlier from typically encountered values, such that a machine learning algorithm using the training example will be skewed to an unlikely range of input 312 and/or output 308; a value that is more than a threshold number of standard deviations away from an average, mean, or expected value, for instance, may be eliminated. Alternatively, or additionally, one or more training examples may be identified as having poor-quality data, where "poor-quality" means having a signal-to-noise ratio below a threshold value. In one or more embodiments, sanitizing training data may include steps such as removing duplicative or otherwise redundant data, interpolating missing data, correcting data errors, standardizing data, identifying outliers, and/or the like. In one or more embodiments, sanitizing training data may include algorithms that identify duplicate entries or spell-check algorithms.

With continued reference to FIG. 3, in one or more embodiments, images used to train an image classifier or other machine learning model and/or process that takes images as inputs 312 or generates images as outputs 308 may be rejected if image quality is below a threshold value. For instance, and without limitation, computing device, processor 104, and/or machine learning module 300 may perform blur detection. Elimination of one or more blurs may be performed, as a nonlimiting example, by taking Fourier transform or a Fast Fourier Transform (FFT) of image and analyzing a distribution of low and high frequencies in the resulting frequency-domain depiction of the image. Numbers of high-frequency values below a threshold level may indicate blurriness. As a further nonlimiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of image, based on the hypothesis that rapid changes indicate sharp edges in the image, and thus are indicative of a lower degree of blurriness. Blur detection may be performed using a wavelet-based operator, which uses coefficients of a discrete wavelet transform to describe the frequency and spatial content of images. Blur detection may be performed using statistics-based operators that take advantage of several image statistics as texture descriptors in order to compute a focus level. Blur detection may be performed by using discrete cosine transform (DCT) coefficients in order to compute a focus level of an image from its frequency content.

With continued reference to FIG. 3, computing device, processor 104, and/or machine learning module 300 may be configured to precondition one or more training examples. For instance, and without limitation, where a machine learning model and/or process has one or more inputs 312 and/or outputs 308 requiring, transmitting, or receiving a certain number of bits, samples, or other units of data, one or more elements of training examples to be used as or compared to inputs 312 and/or outputs 308 may be modified to have such a number of units of data. In one or more embodiments, computing device, processor 104, and/or machine learning module 300 may convert a smaller number of units, such as in a low pixel count image, into a desired number of units by upsampling and interpolating. As a nonlimiting example, a low pixel count image may have 100 pixels, whereas a desired number of pixels may be 128. Processor 104 may interpolate the low pixel count image to convert 100 pixels into 128 pixels. It should also be noted that one of ordinary skill in the art, upon reading the entirety of this disclosure, would recognize the various methods to interpolate a smaller number of data units such as samples, pixels, bits, or the like to a desired number of such units. In one or more embodiments, a set of interpolation rules may be trained by sets of highly detailed inputs 312 and/or outputs 308 and corresponding inputs 312 and/or outputs 308 downsampled to smaller numbers of units, and a neural network or another machine learning model that is trained to predict interpolated pixel values using the training data 304. As a nonlimiting example, a sample input 312 and/or output 308, such as a sample picture, with sample-expanded data units (e.g., pixels added between the original pixels) may be input to a neural network or machine learning model and output a pseudo replica sample picture with dummy values assigned to pixels between the original pixels based on a set of interpolation rules. As a nonlimiting example, in the context of an image classifier, a machine learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, computing device, processor 104, and/or machine learning module 300 may utilize sample expander methods, a low-pass filter, or both. For the purposes of this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor 104, and/or machine learning module 300 may use averaging, such as luma or chroma averaging in images, to fill in data units in between original data units.

With continued reference to FIG. 3, in one or more embodiments, computing device, processor 104, and/or machine learning module 300 may downsample elements of a training example to a desired lower number of data elements. As a nonlimiting example, a high pixel count image may contain 256 pixels, however a desired number of pixels may be 128. Processor 104 may downsample the high pixel count image to convert 256 pixels into 128 pixels. In one or more embodiments, processor 104 may be configured to perform downsampling on data. Downsampling, also known as decimation, may include removing every $N^{th}$ entry in a sequence of samples, all but every $N^{th}$ entry, or the like, which is a process known as "compression" and may be performed, for instance by an N-sample compressor implemented using hardware or software. Anti-aliasing and/or anti-imaging filters, and/or low-pass filters, may be used to eliminate side effects of compression.

With continued reference to FIG. 3, feature selection may include narrowing and/or filtering training data 304 to exclude features and/or elements, or training data including such elements that are not relevant to a purpose for which a trained machine learning model and/or algorithm is being trained, and/or collection of features, elements, or training data including such elements based on relevance to or utility for an intended task or purpose for which a machine learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, wherein a difference between each value, X, and a minimum value, $X_{min}$, in a set or subset of values is divided by a range of values, $X_{max}-X_{min}$, in the set or subset:

$$X_{new} = \frac{X - X_{min}}{X_{max} - X_{min}}.$$

Feature scaling may include mean normalization, wherein a different between each value, X, and a mean value of a set and/or subset of values, $X_{mean}$, is divided by a range of values, $X_{max}-X_{min}$, in the set or subset:

$$X_{new} = \frac{X - X_{mean}}{X_{max} - X_{min}}.$$

Feature scaling may include standardization, wherein a difference between X and $X_{mean}$ is divided by a standard deviation, $\sigma$, of a set or subset of values:

$$X_{new} = \frac{X - X_{mean}}{\sigma}.$$

Feature scaling may be performed using a median value of a set or subset, $X_{median}$, and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

A Person of ordinary skill in the art, upon reviewing the entirety of this disclosure, will be aware of various alternative or additional approaches that may be used for feature scaling.

With continued reference to FIG. 3, computing device, processor 104, and/or machine learning module 300 may be configured to perform one or more processes of data augmentation. For the purposes of this disclosure, "data augmentation" is a process that adds data to a training data 304 using elements and/or entries already in the dataset. Data augmentation may be accomplished, without limitation, using interpolation, generation of modified copies of existing entries and/or examples, and/or one or more generative artificial intelligence (AI) processes, for instance using deep neural networks and/or generative adversarial networks. Generative processes may be referred to alternatively in this context as "data synthesis" and as creating "synthetic data". Augmentation may include performing one or more transformations on data, such as geometric, color space, affine, brightness, cropping, and/or contrast transformations of images.

With continued reference to FIG. 3, machine learning module 300 may be configured to perform a lazy learning process and/or protocol 320. For the purposes of this disclosure, a "lazy learning" process and/or protocol is a process whereby machine learning is conducted upon receipt of input 312 to be converted to output 308 by combining the input 312 and training data 304 to derive the algorithm to be used to produce the output 308 on demand. A lazy learning process may alternatively be referred to as a "lazy loading" or "call-when-needed" process and/or protocol. For instance, an initial set of simulations may be performed to cover an initial heuristic and/or "first guess" at an output 308 and/or relationship. As a nonlimiting example, an initial heuristic may include a ranking of associations between inputs 312 and elements of training data 304. Heuristic may include selecting some number of highest-ranking associations and/or training data 304 elements. Lazy learning may implement any suitable lazy learning algorithm, including without limitation a k-nearest neighbors algorithm, a lazy naive Bayes algorithm, or the like. A person of ordinary skill in the art, upon reviewing the entirety of this disclosure, will be aware of various lazy learning algorithms that may be applied to generate outputs as described in this disclosure, including without limitation lazy learning applications of machine learning algorithms as described in further detail below.

With continued reference to FIG. 3, alternatively or additionally, machine learning processes as described in this disclosure may be used to generate machine learning models 324. A "machine learning model", for the purposes of this disclosure, is a data structure representing and/or instantiating a mathematical and/or algorithmic representation of a relationship between inputs 312 and outputs 308, generated using any machine learning process including without limitation any process described above, and stored in memory. An input 312 is submitted to a machine learning model 324 once created, which generates an output 308 based on the relationship that was derived. For instance, and without limitation, a linear regression model, generated using a linear regression algorithm, may compute a linear combination of input data using coefficients derived during machine learning processes to calculate an output datum. As a further nonlimiting example, a machine learning model 324 may be generated by creating an artificial neural network, such as a convolutional neural network comprising an input layer of nodes, one or more intermediate layers, and an output layer of nodes. Connections between nodes may be created by "training" the network, in which elements from a training data 304 are applied to the input nodes, and a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning, as described in detail below.

With continued reference to FIG. 3, machine learning module 300 may perform at least a supervised machine learning process 328. For the purposes of this disclosure, a "supervised" machine learning process is a process with algorithms that receive training data 304 relating one or more inputs 312 to one or more outputs 308, and seek to generate one or more data structures representing and/or instantiating one or more mathematical relations relating input 312 to output 308, where each of the one or more mathematical relations is optimal according to some criterion specified to the algorithm using some scoring function. For instance, a supervised learning algorithm may include inputs 312 described above as inputs, and outputs 308 described above as outputs, and a scoring function representing a desired form of relationship to be detected between inputs 312 and outputs 308. Scoring function may, for instance, seek to maximize the probability that a given input 312 and/or combination thereof is associated with a given output 308 to minimize the probability that a given input 312 is not associated with a given output 308. Scoring function may be expressed as a risk function representing an "expected loss" of an algorithm relating inputs 312 to outputs 308, where loss is computed as an error function representing a degree to which a prediction generated by the relation is incorrect when compared to a given input-output pair provided in training data 304. Supervised machine learning processes may include classification algorithms as defined above. A person of ordinary skill in the art, upon reviewing the entirety of this disclosure, will be aware of various possible variations of at least a supervised machine learning process 328 that may be used to determine a relation between inputs and outputs.

With continued reference to FIG. 3, training a supervised machine learning process may include, without limitation, iteratively updating coefficients, biases, and weights based on an error function, expected loss, and/or risk function. For instance, an output 308 generated by a supervised machine learning process 328 using an input example in a training example may be compared to an output example from the training example; an error function may be generated based on the comparison, which may include any error function suitable for use with any machine learning algorithm described in this disclosure, including a square of a difference between one or more sets of compared values or the like. Such an error function may be used in turn to update one or more weights, biases, coefficients, or other parameters of a machine learning model through any suitable process including without limitation gradient descent processes, least-squares processes, and/or other processes described in this disclosure. This may be done iteratively and/or recursively to gradually tune such weights, biases, coefficients, or other parameters. Updates may be performed in neural networks using one or more back-propagation algorithms. Iterative and/or recursive updates to weights, biases, coefficients, or other parameters as described above may be performed until currently available training data 304 are exhausted and/or until a convergence test is passed. For the purposes of this disclosure, a "convergence test" is a test for a condition selected to indicate that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively, or additionally, one or more errors and/or error function values evaluated in training iterations may be compared to a threshold.

With continued reference to FIG. 3, a computing device, processor 104, and/or machine learning module 300 may be configured to perform method, method step, sequence of method steps, and/or algorithm described in reference to this figure, in any order and with any degree of repetition. For instance, computing device, processor 104, and/or machine learning module 300 may be configured to perform a single step, sequence, and/or algorithm repeatedly until a desired or commanded outcome is achieved; repetition of a step or a sequence of steps may be performed iteratively and/or recursively using outputs 308 of previous repetitions as inputs 312 to subsequent repetitions, aggregating inputs 312 and/or outputs 308 of repetitions to produce an aggregate result, reduction or decrement of one or more variables such as global variables, and/or division of a larger processing task into a set of iteratively addressed smaller processing tasks. A computing device, processor 104, system 100, or machine learning module 300 may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. A person of ordinary skill in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 3, machine learning process may include at least an unsupervised machine learning process 332. For the purposes of this disclosure, an unsupervised machine learning process is a process that derives inferences in datasets without regard to labels. As a result, an unsupervised machine learning process 332 may be free to discover any structure, relationship, and/or correlation provided in the data. Unsupervised processes 332 may not require a response variable, may be used to find interesting patterns and/or inferences between variables, to determine a degree of correlation between two or more variables, or the like.

With continued reference to FIG. 3, machine learning module 300 may be designed and configured to create machine learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include an elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to a person of ordinary skill in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought. Similar methods to those described above may be applied to minimize error functions, as will be apparent to a person of ordinary skill in the art upon reviewing the entirety of this disclosure.

With continued reference to FIG. 3, machine learning algorithms may include, without limitation, linear discriminant analysis. Machine learning algorithm may include quadratic discriminant analysis. Machine learning algorithms may include kernel ridge regression. Machine learning algorithms may include support vector machines, including without limitation support vector classification-based regression processes. Machine learning algorithms may include stochastic gradient descent algorithms, including classification and regression algorithms based on stochastic gradient descent. Machine learning algorithms may include nearest neighbors algorithms. Machine learning algorithms may include various forms of latent space regularization such as variational regularization. Machine learning algorithms may include Gaussian processes such as Gaussian Process Regression. Machine learning algorithms may include cross-decomposition algorithms, including partial least squares and/or canonical correlation analysis. Machine learning algorithms may include naive Bayes methods. Machine learning algorithms may include algorithms based on decision trees, such as decision tree classification or regression algorithms. Machine learning algorithms may include ensemble methods such as bagging meta-estimator, forest of randomized trees, AdaBoost, gradient tree boosting, and/or voting classifier methods. Machine learning algorithms may include neural net algorithms, including convolutional neural net processes.

With continued reference to FIG. 3, a machine learning model and/or process may be deployed or instantiated by incorporation into a program, apparatus, system, and/or module. For instance, and without limitation, a machine learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit, to represent a number according to any suitable encoding system including twos complement or the like, or may be stored in any volatile and/or non-volatile memory. Similarly, mathematical operations and input 312 and/or output 308 of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine learning process and/or model, including without limitation any combination of production and/or configuration of non-reconfigurable hardware elements, circuits, and/or modules such as without limitation application-specific integrated circuits (ASICs), production and/or configuration of reconfigurable hardware elements, circuits, and/or modules such as without limitation field programmable gate arrays (FPGAs), production and/or configuration of non-reconfigurable and/or non-rewritable memory elements, circuits, and/or modules such as without limitation non-rewritable read-only memory (ROM), other memory technology described in this disclosure, and/or production and/or configuration of any computing device and/or component thereof as described in this disclosure. Such deployed and/or instantiated machine learning model and/or algorithm may receive inputs 312 from any other process, module, and/or component described in this disclosure, and produce outputs 308 to any other process, module, and/or component described in this disclosure.

With continued reference to FIG. 3, any process of training, retraining, deployment, and/or instantiation of any machine learning model and/or algorithm may be performed and/or repeated after an initial deployment and/or instantiation to correct, refine, and/or improve the machine learning model and/or algorithm. Such retraining, deployment, and/ or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs 308 of machine learning models and/or algorithms, and/or errors and/or error functions thereof, to any thresholds, convergence tests, or the like, and/or may compare outputs 308 of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

With continued reference to FIG. 3, retraining and/or additional training may be performed using any process for training described above, using any currently or previously deployed version of a machine learning model and/or algorithm as a starting point. Training data for retraining may be collected, preconditioned, sorted, classified, sanitized, or otherwise processed according to any process described in this disclosure. Training data 304 may include, without limitation, training examples including inputs 312 and correlated outputs 308 used, received, and/or generated from any version of any system, module, machine learning model or algorithm, apparatus, and/or method described in this disclosure. Such examples may be modified and/or labeled according to user feedback or other processes to indicate desired results, and/or may have actual or measured results from a process being modeled and/or predicted by system, module, machine learning model or algorithm, apparatus, and/or method as "desired" results to be compared to outputs 308 for training processes as described above. Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

With continued reference to FIG. 3, one or more processes or algorithms described above may be performed by at least a dedicated hardware unit 336. For the purposes of this disclosure, a "dedicated hardware unit" is a hardware component, circuit, or the like, aside from a principal control circuit and/or processor 104 performing method steps as described in this disclosure, that is specifically designated or selected to perform one or more specific tasks and/or processes described in reference to this figure. Such specific tasks and/or processes may include without limitation preprocessing and/or sanitization of training data and/or training a machine learning algorithm and/or model. Dedicated hardware unit 336 may include, without limitation, a hardware unit that can perform iterative or massed calculations, such as matrix-based calculations to update or tune parameters, weights, coefficients, and/or biases of machine learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously, in parallel, and/or the like. Such dedicated hardware units 336 may include, without limitation, graphical processing units (GPUs), dedicated signal processing modules, field programmable gate arrays (FPGA), other reconfigurable hardware that has been configured to instantiate parallel processing units for one or more specific tasks, or the like. Computing device, processor 104, system 100, or machine learning module 300 may be configured to instruct one or more dedicated hardware units 336 to perform one or more operations described herein, such as evaluation of model and/or algorithm outputs, one-time or iterative updates to parameters, coefficients, weights, and/or biases, vector and/or matrix operations, and/or any other operations described in this disclosure.

Figure 4:
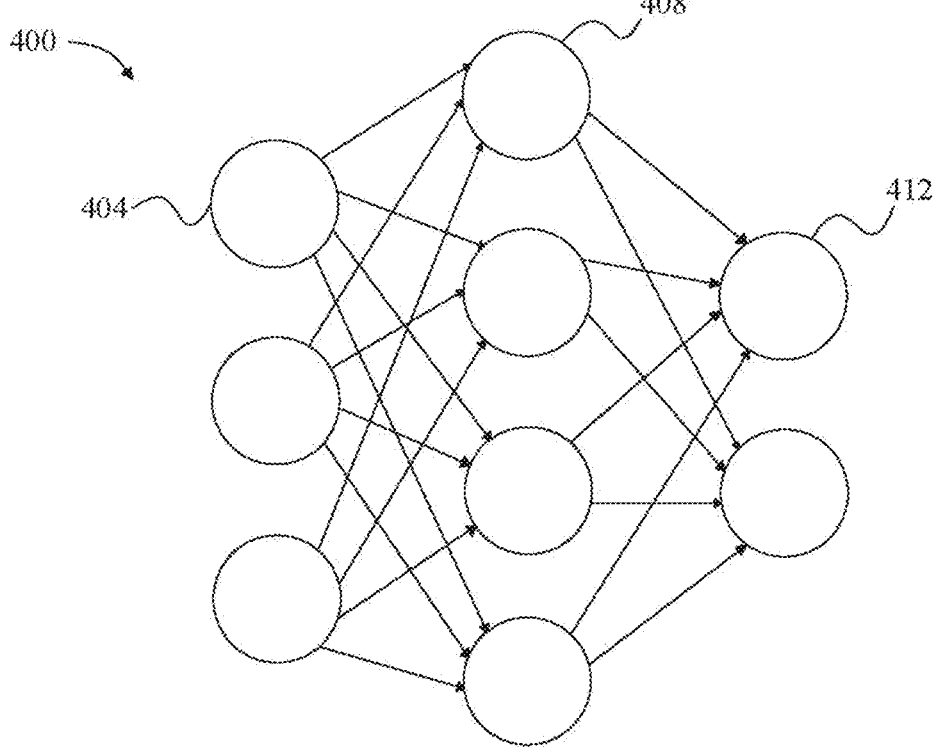
FIG. 4 is a block diagram of an exemplary embodiment of a neural network.

Referring now to FIG. 4, an exemplary embodiment of neural network 400 is illustrated. For the purposes of this disclosure, a neural network or artificial neural network is a network of "nodes" or data structures having one or more inputs, one or more outputs, and a function determining outputs based on inputs. Such nodes may be organized in a network, such as without limitation a convolutional neural network, including an input layer of nodes 404, at least an intermediate layer of nodes 408, and an output layer of nodes 412. Connections between nodes may be created via the process of "training" neural network 400, in which elements from a training dataset are applied to the input nodes, and a suitable training algorithm (such as Levenberg-Marquardt, conjugate gradient, simulated annealing, or other algorithms) is then used to adjust the connections and weights between nodes in adjacent layers of the neural network 400 to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network". As a further nonlimiting example, neural network 400 may include a convolutional neural network comprising an input layer of nodes 404, one or more intermediate layers of nodes 408, and an output layer of nodes 412. For the purposes of this disclosure, a "convolutional neural network" is a type of neural network 400 in which at least one hidden layer is a convolutional layer that convolves inputs to that layer with a subset of inputs known as a "kernel", along with one or more additional layers such as pooling layers, fully connected layers, and the like.

Figure 5:
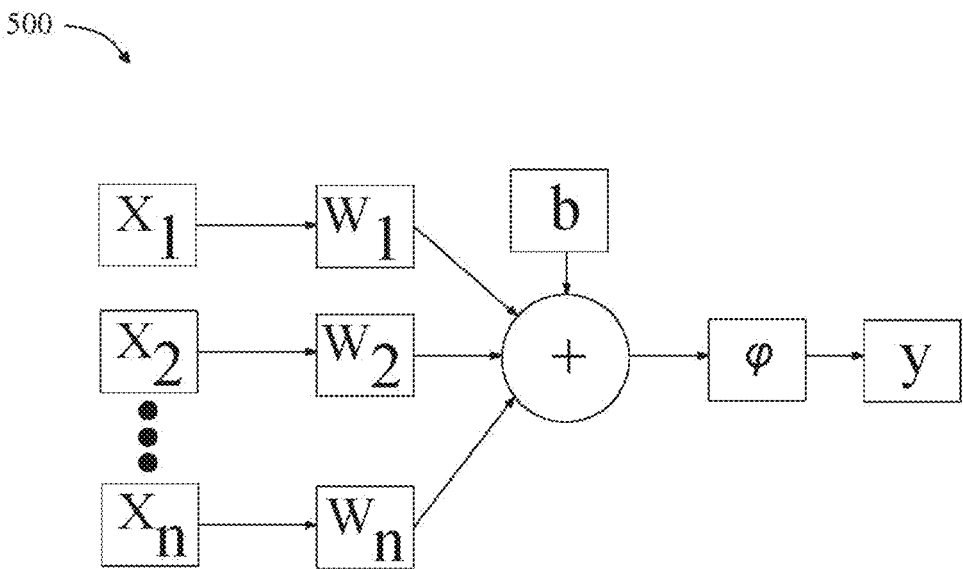
FIG. 5 is a block diagram of an exemplary embodiment of a node of a neural network.

Referring now to FIG. 5, an exemplary embodiment of a node 500 of neural network 400 is illustrated. Node 500 may include, without limitation, a plurality of inputs, $x_i$, that may receive numerical values from inputs to neural network 400 containing the node 500 and/or from other nodes 500. Node 500 may perform one or more activation functions to produce its output given one or more inputs, such as without limitation computing a binary step function comparing an input to a threshold value and outputting either a logic 1 or logic 0 output or its equivalent, a linear activation function whereby an output is directly proportional to input, and/or a nonlinear activation function wherein the output is not proportional to the input. Nonlinear activation functions may include, without limitation, a sigmoid function of the form $$f(x) = \frac{1}{1 - e^{-x}}$$

given input x, a tanh (hyperbolic tangent) function of the form $$\frac{e^x - e^{-x}}{e^x + e^{-x}},$$

a tanh derivative function such as $f(x) = \tanh^2(x)$, a rectified linear unit function such as $f(x) = \max(0, x)$, a "leaky" and/or "parametric" rectified linear unit function such as $f(x) = \max(ax, x)$ for some value of a, an exponential linear units function such as $$f(x) = \begin{cases} x \text{ for } x \geq 0 \\ \alpha(e^x - 1) \text{ for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x) = x*\text{sigmoid}(x)$, a Gaussian error linear unit function such as $f(x) = a(1 + \tanh(\sqrt{2/\pi}(x + bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$, that may be used as activation functions. As a nonlimiting and illustrative example, node 500 may perform a weighted sum of inputs using weights, $w_i$, that are multiplied by respective inputs, $x_i$. Additionally, or alternatively, a bias b may be added to the weighted sum of the inputs such that an offset is added to each unit in a neural network layer that is independent of the input to the layer. The weighted sum may then be input into a function, $\varphi$, which may generate one or more outputs, y. Weight, $w_i$, applied to an input, $x_i$, may indicate whether the input is "excitatory", indicating that it has strong influence on the one or more outputs, y, for instance by the corresponding weight having a large numerical value, or "inhibitory", indicating it has a weak influence on the one more outputs, y, for instance by the corresponding weight having a small numerical value. The values of weights, $w_i$, may be determined by training neural network 400 using training data, which may be performed using any suitable process as described above.

Figure 6:
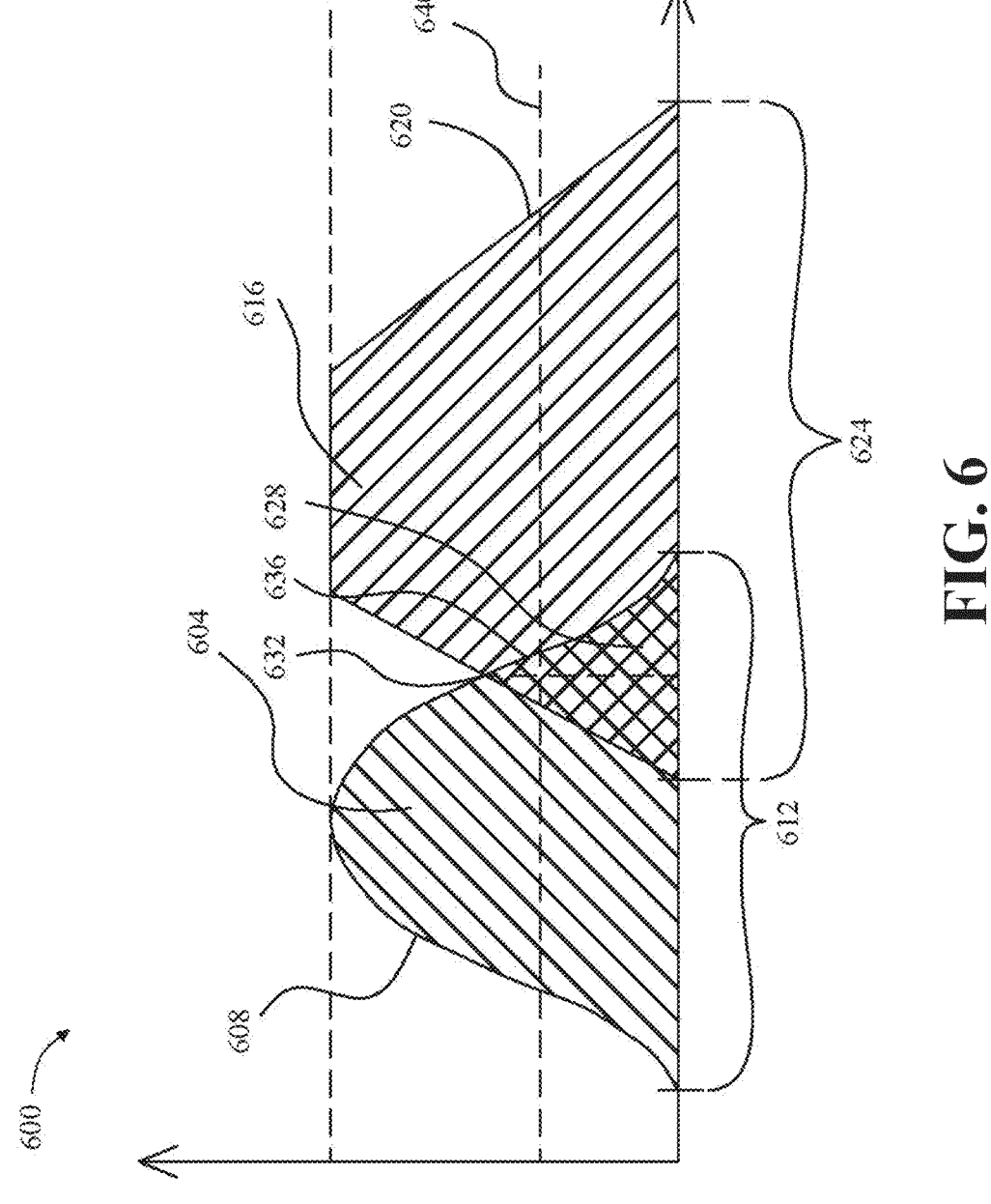
FIG. 6 is an illustration of an exemplary embodiment of fuzzy set comparison.

Referring now to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within the first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range of values 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \dfrac{x - a}{b - a}, \text{ for } a \leq x < b \\ \dfrac{c - x}{c - b}, \text{ if } b < x \leq c \end{cases}$$

a trapezoidal membership function may be defined as:

$$y(x, a, b, c, d) = \max\left(\min\left(\frac{x - a}{b - a}, 1, \frac{d - x}{d - c}\right), 0\right)$$

a sigmoidal function may be defined as:

$$y(x, a, c) = \frac{1}{1 - e^{-a(x - c)}}$$

a Gaussian membership function may be defined as:

$$y(x, c, \sigma) = e^{-\frac{1}{2}\left(\frac{x - c}{\sigma}\right)^2}$$

and a bell membership function may be defined as:

$$y(x, a, b, c) = \left[1 + \left|\frac{x - c}{a}\right|^{2b}\right]^{-1}$$

A person of ordinary skill in the art, upon reviewing the entirety of this disclosure, will be aware of various alternative or additional membership functions that may be used consistently with this disclosure.

With continued reference to FIG. 6, in one or more embodiments, first fuzzy set 604 may represent any value or combination of values as described above, including output from one or more machine learning models. A second fuzzy set 616, which may represent any value which may be represented by first fuzzy set 604, may be defined by a second membership function 620 on a second range 624; second range 624 may be identical and/or overlap with first range of values 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively, or additionally, a single value of first and/or second fuzzy set may be located at a locus 636 on first range of values 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a nonlimiting example, represent a degree of match between first fuzzy set 604 and second fuzzy set 616, and/or single values therein with each other or with either set, which is sufficient for purposes of the matching process; for instance, threshold 640 may indicate a sufficient degree of overlap between an output from one or more machine learning models. Alternatively, or additionally, each threshold 640 may be tuned by a machine learning and/or statistical process, for instance and without limitation as described in further detail in this disclosure.

With continued reference to FIG. 6, in one or more embodiments, a degree of match between fuzzy sets may be used to classify plurality of input data, such as event data 112 and/or supplemental event data 148, as described above in this disclosure. As a nonlimiting example, if one or more input data are associated with a fuzzy set that matches a fuzzy set of a cohort by having a degree of overlap exceeding a threshold, computing device may classify the input data as belonging to that cohort. Where multiple fuzzy matches are performed, degrees of match for each respective fuzzy set may be computed and aggregated through, for instance, addition, averaging, or the like, to determine an overall degree of match.

With continued reference to FIG. 6, in one or more embodiments, one or more input data may be compared to multiple fuzzy sets of multiple cohorts. As a nonlimiting example, one or more input data may be represented by a fuzzy set that is compared to each of the multiple fuzzy sets of multiple cohorts, and a degree of overlap exceeding a threshold between the fuzzy set representing the input data and any of the multiple fuzzy sets representing multiple cohorts may cause computing device to classify the input data as belonging to that cohort. As a nonlimiting example, there may be two fuzzy sets representing two cohorts, cohort A and cohort B. Cohort A may have a cohort A fuzzy set, cohort B may have a cohort B fuzzy set, and input data may have a input data fuzzy set. Computing device may compare input data fuzzy set with each of cohort A fuzzy set and cohort B fuzzy set, as described above, and classify the input data to either, both, or neither of cohort A fuzzy set and cohort B fuzzy set. Machine learning methods as described throughout this disclosure may, in a nonlimiting example, generate coefficients used in fuzzy set equations as described above, such as without limitation x, c, and σ a Gaussian set as described above, as outputs of machine learning methods. Likewise, input data may be used indirectly to determine a fuzzy set, as input data fuzzy set may be derived from outputs of one or more machine learning models that take the input data directly or indirectly as inputs.

With continued reference to FIG. 6, in one or more embodiments, fuzzy set comparison 600 may include a fuzzy inference model. For the purposes of this disclosure, a "fuzzy inference model" is a model that uses fuzzy logic to reach a decision and derive a meaningful outcome. As a nonlimiting example, a fuzzy inference system may be associated with probabilities of progress indications 152, such as "ahead of schedule", "on time", "behind schedule", and "indeterminate". In one or more embodiments, an inferencing rule may be applied to determine a fuzzy set membership of a combined output based on the fuzzy set membership of linguistic variables. As a nonlimiting example, membership of a combined output in a "on time" fuzzy set may be determined based on a percentage membership of a second linguistic variable with a first mode in an "on time" fuzzy set and a percentage membership of a second linguistic variable associated with a second mode in a "ahead of schedule" fuzzy set. In one or more embodiments, parameters of progress indications 152 may then be determined by comparison to a threshold or output using another defuzzification process. Each stage of such a process may be implemented using any type of machine learning model, such as any type of neural network, as described herein. In one or more embodiments, parameters of one or more fuzzy sets may be tuned using machine learning. In one or more embodiments, fuzzy inferencing and/or machine learning may be used to synthesize outputs of plurality of progress indications 152. In some cases, outputs such as progress indications 152 may be combined to make an overall or final determination, which may be displayed with or instead of individual outputs. As another nonlimiting example, outputs may be ranked, wherein the output with the highest confidence score may be the output displayed at display device 176 or displayed first in a ranked display of result outputs.

With continued reference to FIG. 6, fuzzy set comparison 600 may be generated as a function of determining a data compatibility threshold. Data compatibility threshold may be determined by a computing device. In some embodiments, computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine learning, or other method that may occur to a person of ordinary skill in the art upon reviewing the entirety of this disclosure. In some embodiments, determining compatibility threshold may include using a linear regression model. A linear regression model may include a machine learning model. In some embodiments, determining compatibility threshold may include using a classification model. A classification model may be configured to input collected data and cluster data to a centroid based on, but not limited to, frequency of appearance, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility thresholds using fuzzy logic. In some embodiments, a plurality of computing devices may be arranged by a logic comparison program into compatibility arrangements. Membership function coefficients and/or constants as described above may be tuned according to classification and/or clustering algorithms. As a nonlimiting example, a clustering algorithm may determine a Gaussian or other distribution about a centroid corresponding to a given compatibility threshold, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

With continued reference to FIG. 6, an inference engine may combine rules, such as any semantic language the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b(a+b−a×b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively, or additionally, T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

Referring now to FIG. 7, an exemplary embodiment of a method 700 for setting and monitoring checkpoints 136 in structured data is described. At step 705, method 700 includes retrieving, by processor 104, event data 112, wherein the event data 112 includes at least an objective 120. This step may be implemented with reference to details described above in this disclosure and without limitation.

With continued reference to FIG. 7, at step 710, method 700 includes identifying, by processor 104 using first machine learning model 140a, at least a checkpoint 136 as a function of retrieved event data 112. This step may be implemented with reference to details described above in this disclosure and without limitation.

With continued reference to FIG. 7, at step 715, method 700 includes validating, by processor 104, generated at least a checkpoint 136 against event data 112 and at least an objective 120. This step may be implemented with reference to details described above in this disclosure and without limitation.

With continued reference to FIG. 7, at step 720, method 700 includes monitoring, by processor 104 using second machine learning model 140b, progress as a function of validated at least a checkpoint 136, wherein monitoring the progress includes receiving supplemental event data 148, comparing the supplemental event data 148 against the at least a checkpoint 136, and generating progress indication 152 as a function of the comparison. This step may be implemented with reference to details described above in this disclosure and without limitation.

With continued reference to FIG. 7, at step 725, method 700 includes generating, by processor 104, recommended course of action 164 as a function of progress indication 152. This step may be implemented with reference to details described above in this disclosure and without limitation.

Figure 8:
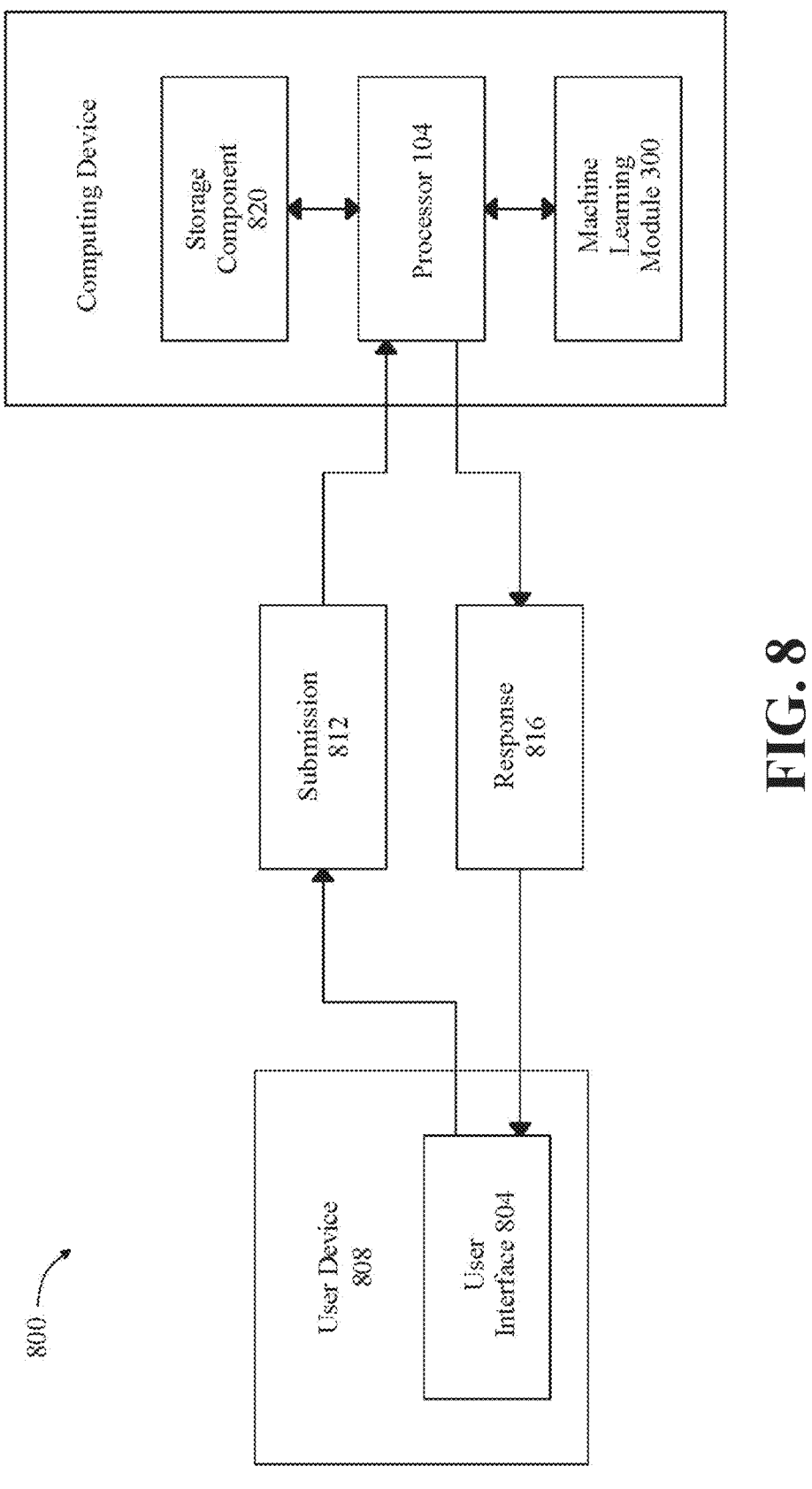
FIG. 8 is an exemplary embodiment of a chatbot system.

Referring now to FIG. 8, in one or more embodiments, system 100 may perform one or more of its functions, such as retrieving event data 112, by implementing at least a chatbot system 800, an exemplary embodiment of which is schematically illustrated. In one or more embodiments, a user interface 804 may be communicatively connected with a computing device that is configured to operate a chatbot. In some cases, user interface 804 may be local to computing device. Alternatively, or additionally, in some other cases, user interface 804 may be remote to computing device, e.g., as part of a user device 808, and communicative with the computing device and processor 104 therein, by way of one or more networks, such as without limitation the internet. Alternatively, or additionally, user interface 804 may communicate with user interface 804 and/or computing device using telephonic devices and networks, such as without limitation fax machines, short message service (SMS), or multimedia message service (MMS). Commonly, user interface 804 may communicate with computing device using text-based communication, for example without limitation using a character encoding protocol, such as American Standard for Information Interchange (ASCII). Typically, user interface 804 may conversationally interface a chatbot, by way of at least a submission 812, from the user interface 804 to the chatbot, and a response 816, from the chatbot to the user interface 804. In many cases, one or both of submission 812 and response 816 are text-based communication. Alternatively, or additionally, in some cases, one or both of submission 812 and response 816 are audio-based communication.

With continued reference to FIG. 8, submission 812, once received by user interface 804 and/or computing device that operates a chatbot, may be processed by processor 104. In one or more embodiments, processor 104 may process submission 812 using one or more of keyword recognition, pattern matching, and natural language processing. In one or more embodiments, processor 104 may employ real-time learning with evolutionary algorithms. In one or more embodiments, processor 104 may retrieve a pre-prepared response from at least a storage component 820, based upon submission 812. Alternatively, or additionally, in one or more embodiments, processor 104 may communicate a response 816 without first receiving a submission 812, thereby initiating a conversation. In some cases, processor 104 may communicate an inquiry to user interface 804 and/or computing device, wherein processor 104 is configured to process an answer to the inquiry in a following submission 812 from the user interface 804 and/or computing device. In some cases, an answer to an inquiry presented within submission 812 from user interface 804 and/or computing device may be used by the computing device as an input to another function.

Figure 9:
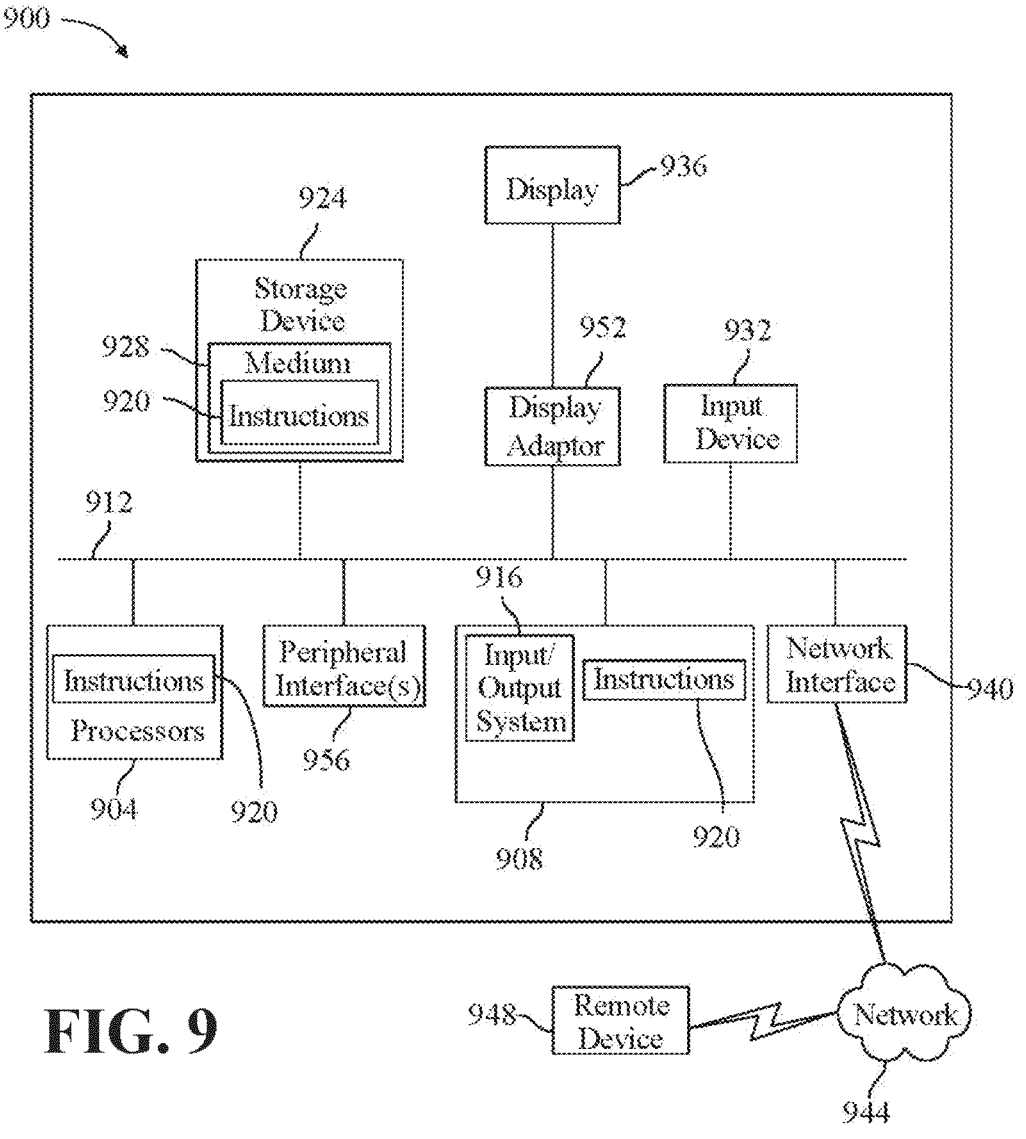
FIG. 9 is a block diagram of an exemplary embodiment of a computing system that can be used to implement any one or more of the methodologies disclosed herein and any one or more portions thereof.

Referring now to FIG. 9, it is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to one of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module. Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission. Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein. Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

With continued reference to FIG. 9, the figure shows a diagrammatic representation of one embodiment of a computing device in the exemplary form of a computing system 900 within which a set of instructions for causing the computing system 900 to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computing system 900 may include a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures. Processor 904 may include any suitable processor, such as without limitation a processor incorporating logical circuitry for performing arithmetic and logical operations, such as an arithmetic and logic unit, which may be regulated with a state machine and directed by operational inputs from memory and/or sensors; processor 904 may be organized according to Von Neumann and/or Harvard architecture as a nonlimiting example. Processor 904 may include, incorporate, and/or be incorporated in, without limitation, a microcontroller, microprocessor, digital signal processor, field programmable gate array, complex programmable logic device, graphical processing unit, general-purpose graphical processing unit, tensor processing unit, analog or mixed signal processor, trusted platform module, a floating-point unit, and/or system on a chip.

Memory 908 may include various components (e.g., machine-readable media) including, but not limited to, a random-access memory component, a read only component, and any combinations thereof. In one example, a basic input/output system 916, including basic routines that help to transfer information between elements within computing system 900, such as during start-up, may be stored in memory 908. Memory 908 (e.g., stored on one or more machine-readable media) may also include instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computing system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, small computer system interface, advanced technology attachment, serial advanced technology attachment, universal serial bus, IEEE 1394 (FIREWIRE), and any combinations thereof. In one example, storage device 924 (or one or more components thereof) may be removably interfaced with computing system 900 (e.g., via an external port connector (not shown)). Particularly, storage device 924 and an associated machine-readable medium 928 may provide nonvolatile and/or volatile storage of machine-readable instructions, data structures, program modules, and/or other data for computing system 900. In one example, software 920 may reside, completely or partially, within machine-readable medium 928. In another example, software 920 may reside, completely or partially, within processor 904.

With continued reference to FIG. 9, computing system 900 may also include an input device 932. In one example, a user of computing system 900 may enter commands and/or other information into computing system 900 via input device 932. Examples of input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display device 936, discussed further below. Input device 932 may be utilized as a user selection device for selecting one or more graphical representations in a graphical interface as described above.

With continued reference to FIG. 9, user may also input commands and/or other information to computing system 900 via storage device 924 (e.g., a removable disk drive, a flash drive, etc.) and/or network interface device 940. A network interface device, such as network interface device 940, may be utilized for connecting computing system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide-area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computing system 900 via network interface device 940.

With continued reference to FIG. 9, computing system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computing system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those in the art that various changes, omissions and additions may be made to that which is specifically disclosed herein without departing from the spirit and scope of the present invention.

What is claimed is:

1. A system for setting and monitoring checkpoints in structured data, the system comprising:
   a processor; and
   a memory communicatively connected to the processor, wherein the memory comprises instructions configuring the processor to:
   retrieve event data, wherein the event data comprises at least an objective, wherein retrieving event data comprises:
   identifying a first timestamp and a second timestamp from the event data;
   determining a temporal span as a function of the first timestamp and the second timestamp; and
   determining the at least an objective as a function of the first timestamp, the second timestamp, and the temporal span;
   identify, using a first machine learning model trained on checkpoint identification training data, at least a checkpoint as a function of the event data, wherein the checkpoint training data comprises one or more validated event data from previous sessions,
   wherein using the first machine learning model comprises:
   retrieving from a server-side data storage a cross-session state variable comprising prior session datum based on device identifier; and
   inputting the cross-session state variable and event data into the first machine learning model;
   validate the at least a checkpoint against the event data and the at least an objective;
   monitor, using a second machine learning model trained on progress indication training data, a progress as a function of the at least a checkpoint, wherein monitoring the progress comprises:
   receiving supplemental event data;
   comparing the supplemental event data against the at least a checkpoint; and
   generating a progress indication as a function of the comparison; and
   generate a recommended course of action comprising a corrective action including suggestions for an entity to modify its work habits as a function of the progress indication.

2. The system of claim 1, wherein identifying the at least a checkpoint comprises training a first classifier using the checkpoint generation training data, wherein the checkpoint generation training data comprise a plurality of exemplary checkpoints correlated to a plurality of exemplary primary input data.

3. The system of claim 1, wherein:
   the event data further comprises a performance metric pertaining to an entity; and
   validating the generated at least a checkpoint comprises modifying the generated at least a checkpoint as a function of the performance metric.

4. The system of claim 1, wherein monitoring the progress comprises training a second classifier using the progress indication training data, wherein the progress indication training data comprise a plurality of exemplary progress indications correlated to a plurality of exemplary supplemental event data and a plurality of exemplary checkpoints.

5. The system of claim 1, wherein the progress indication comprises a likelihood metric.

6. The system of claim 1, wherein the recommended course of action comprises at least a corrective action.

7. The system of claim 1, wherein the generating the recommended course of action comprises modifying the at least an objective as a function of the progress indication.

8. The system of claim 1, wherein comparing the supplemental event data against the validated at least a checkpoint comprises:

extracting from the at least a checkpoint a first time-correlated attribute;

extracting from the supplemental event data a second time-correlated attribute; and comparing the second time-correlated attribute against the first time-correlated attribute.

9. The system of claim 1, wherein the processor is further configured to:

generate a notification as a function of the at least a recommended course of action; and display the notification to an entity using a user interface.

10. A method for setting and monitoring checkpoints in structured data, the method comprising:

retrieving, by a processor, event data, wherein the event data comprises at least an objective, wherein retrieving event data comprises:

identifying a first timestamp and a second timestamp from the event data;

determining a temporal span as a function of the first timestamp and the second timestamp; and determining the at least an objective as a function of the first timestamp, the second timestamp, and the temporal span;

identifying, by the processor using a first machine learning model trained on checkpoint identification training data, at least a checkpoint as a function of the event data, wherein the checkpoint training data comprises one or more validated event data from previous sessions, wherein using the first machine learning model comprises:

retrieving from a server-side data storage a cross-session state variable comprising prior session datum based on device identifier; and inputting the cross-session state variable and event data into the first machine learning model;

validating, by the processor, the at least a checkpoint against the event data and the at least an objective;

monitoring, by the processor using a second machine learning model trained on progress indication training data, a progress as a function of the at least a checkpoint, wherein monitoring the progress comprises:

receiving supplemental event data;

comparing the supplemental event data against the at least a checkpoint; and generating a progress indication as a function of the comparison; and generating, by the processor, a recommended course of action comprising a corrective action including suggestions for an entity to modify its work habits as a function of the progress indication.

11. The method of claim 10, wherein identifying the at least a checkpoint comprises training a first classifier using the checkpoint generation training data, wherein the checkpoint generation training data comprise a plurality of exemplary checkpoints correlated to a plurality of exemplary primary input data.

12. The method of claim 10, wherein:

the event data further comprises a performance metric pertaining to an entity; and validating the generated at least a checkpoint comprises modifying the generated at least a checkpoint as a function of the performance metric.

13. The method of claim 10, wherein monitoring the progress comprises training a second classifier using the progress indication training data, wherein the progress indication training data comprise a plurality of exemplary progress indications correlated to a plurality of exemplary supplemental event data and a plurality of exemplary checkpoints.

14. The method of claim 10, wherein the progress indication comprises a likelihood metric.

15. The method of claim 10, wherein the recommended course of action comprises at least a corrective action.

16. The method of claim 10, wherein the generating the recommended course of action comprises modifying the at least an objective as a function of the progress indication.

17. The method of claim 10, wherein comparing the supplemental event data against the validated at least a checkpoint comprises:

extracting from the at least a checkpoint a first time-correlated attribute;

extracting from the supplemental event data a second time-correlated attribute; and comparing the second time-correlated attribute against the first time-correlated attribute.

18. The method of claim 10, further comprising:

generating, by the processor, a notification as a function of the at least a recommended course of action; and displaying, by the processor, the notification to an entity using a user interface.

* * * * *